(12) United States Patent
Nomura et al.

(10) Patent No.: US 10,949,405 B2
(45) Date of Patent: Mar. 16, 2021

(54) DATA DEDUPLICATION DEVICE, DATA DEDUPLICATION METHOD, AND DATA DEDUPLICATION PROGRAM

(71) Applicant: Hitachi, Ltd., Tokyo (JP)

(72) Inventors: Shimpei Nomura, Tokyo (JP); Mitsuo Hayasaka, Tokyo (JP); Jun Nemoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 94 days.

(21) Appl. No.: 16/287,242

(22) Filed: Feb. 27, 2019

(65) Prior Publication Data

US 2020/0097452 A1 Mar. 26, 2020

(30) Foreign Application Priority Data

Sep. 20, 2018 (JP) .............................. JP2018-176443

(51) Int. Cl.
*G06F 7/00* (2006.01)
*G06F 16/215* (2019.01)
*G06F 16/22* (2019.01)

(52) U.S. Cl.
CPC ........ *G06F 16/215* (2019.01); *G06F 16/2255* (2019.01)

(58) Field of Classification Search
CPC .......................... G06F 16/215; G06F 16/2255
USPC .................................................. 707/600–899
See application file for complete search history.

(56) References Cited

U.S. PATENT DOCUMENTS 9,952,936 B2    4/2018  Hayasaka et al.
2015/0213049 A1*  7/2015  Kleiman ............. G06F 16/1752
                                                    707/692

\* cited by examiner

*Primary Examiner* — Isaac M Woo
(74) *Attorney, Agent, or Firm* — Mattingly & Malur, PC

(57) ABSTRACT

A data deduplication device reduces a processing load in deduplication. Storage target data includes a content including a plurality of blocks having a structure in which transaction data and a hash value of a preceding block are associated with each other. A storage includes a storage device and a processor, which (1) acquires a hash value associated with one or more blocks of a chunk including the block in the content, and specifies a fingerprint corresponding to the chunk based on the acquired one or more hash values of the block, (2) determines whether the fingerprint corresponding to the chunk is the same as a fingerprint of a chunk stored in the storage device, and (3) does not store the chunk in the storage device when it is determined to be the same, and stores the chunk in the storage device when it is determined to not be the same.

12 Claims, 16 Drawing Sheets

FIG. 7

600A CONTENT INDEX TABLE

| 601 CHUNK ID | 602 FP | 603 CONTAINER ID | 604 OFFSET | 605 CHUNK LENGTH | 606 BC BLOCK CHUNK DETERMINATION |
|---|---|---|---|---|---|
| 1 | $FP_{A1}$ | a | $Offset_{A1}$ | $Length_{A1}$ | False |
| 2 | $FP_{A2}$ | a | $Offset_{A2}$ | $Length_{A2}$ | False |
| 3 | $FP_{A3}$ | a | $Offset_{A3}$ | $Length_{A3}$ | False |
| 4 | $FP_{A4}$ | a | $Offset_{A4}$ | $Length_{A4}$ | False |

600B CONTENT INDEX TABLE

FIG. 10

BC BLOCK STORAGE DESTINATION SETTING SCREEN 1000

| 1001 BC BASED SOFTWARE | 1002 VERSION | 1003 CHAIN ID | 1004 NON-DUPLICATION ALERT | 1005 SERVER ID | 1006 STORAGE DIRECTORY | 1007 FILE NAME |
|---|---|---|---|---|---|---|
| SW₁ | 1.0 | 1 | VALID | 1 | /var/blockchain/chains/ | blockfile_[0-9][6] |
| | | | | 2 | /var/blockchain/chains/ | blockfile_[0-9][6] |
| | | | | 3 | /var/blockchain/chains/ | blockfile_[0-9][6] |

DATA DEDUPLICATION DEVICE, DATA DEDUPLICATION METHOD, AND DATA DEDUPLICATION PROGRAM

CROSS-REFERENCE TO RELATED APPLICATION

The present application claims priority from Japanese application JP 2018-176443, filed on Sep. 20, 2018, the contents of which is hereby incorporated by reference into this application.

BACKGROUND OF THE INVENTION

1. Field of the Invention

The technical field relates to a data deduplication device or the like that eliminates duplication of storage target data and stores the same.

2. Description of the Related Art

Block Chain (BC) technology receives only a transaction agreed among a plurality of transaction entities and manages transaction data with a data structure referred to as block chain, making it difficult for data falsification. By applying the BC technology, it is possible to construct a system that allows a direct transaction among users without management of transaction by a third party institution. Accordingly, speeding-up in transaction and reduction in cost can be expected. The BC technology is expected to be utilized in many fields such as finance and industry.

In the block chain (BC) system, in order to make it difficult for data falsification, a data structure is adopted in which a plurality of transaction data and a hash value calculated from a preceding block are stored together in a unit referred to as BC block. The BC blocks continue to increase each time a transaction is repeated, and data is duplicated to all BC servers participating in the BC system. In order to store and manage increasing data in such a BC system at low cost, tiering in storage system is effective. In addition, backup to the storage system is necessary as a countermeasure against data errors occurred by an operation mistake or the like.

As a method for tiering or backing up data of the BC server to the storage system at high speed, a technique disclosed in Patent Literature 1 is known. Patent Literature 1 discloses a technique of performing data deduplication in advance on a server and transferring only non-duplication data to a remote storage system. The deduplication is a technique to detect existence of data with duplicate contents (duplicate data) in storage data of the storage system and to reduce the amount of data transferred and the amount of data to be stored by reducing the duplicate data. In the technique of Patent Literature 1, a part of information necessary for deduplication is distributed by the storage system according to a request from a server, and the deduplication processing is dispersedly executed in each server to improve the performance.

Patent Literature 1: U.S. Pat. No. 9,952,936

The deduplication divides the storage data into a plurality of pieces and determines duplication of contents of the divided data. Hereinafter, a unit of duplication determined data will be referred to as "chunk". Since the size of the chunk is, for example, several kilobytes or more, a lot of time and cost are required when comparing mutual chunks for duplication determination. Therefore, by calculating a message digest from each chunk and comparing a value of the message digest, processing time and cost are reduced by replacing the duplication determination. Here, an output result of the message digest is referred to as "Finger Print (FP)". The FP uses a hash value of a hash function having a strong collision resistance such as Secure Hash Algorithm (SHA)-2, SHA-3. A table (FPT: Finger Print Table) in which the FP of stored data is registered is created, and the FP of target data is searched from the table, thereby performing the duplication determination.

For example, according to the technique described in Patent Literature 1, it is necessary to perform a hash calculation on the server in order to eliminate duplication; since a processing load by the hash calculation is high, there is a problem that performance of tiering and backup is decreased.

The present invention has been made in view of the above circumstances, and an object thereof is to provide a technique capable of reducing the processing load in deduplication.

SUMMARY OF THE INVENTION

In order to achieve the above object, one aspect provides a data deduplication device that eliminates duplication of storage target data and stores the storage target data in a storage device for storage. The storage target data includes a data set including a plurality of data groups managed in a time series. The data groups include one or more management data, and a hash value of the data groups is stored in association with another data group having a predetermined relationship with the data groups. The data deduplication device includes a storage device that stores the data set and a processor unit, and causes the processor unit to (1) acquire a hash value of one or more data groups of storage unit data including the one or more data groups in a data set, and specify a fingerprint corresponding to the storage unit data based on the acquired hash value of the one or more acquired data groups, (2) determine whether or not the fingerprint corresponding to the storage unit data is the same as a fingerprint of stored storage unit data stored in the storage device for storage, and (3) not to store the storage unit data in the storage device for storage when it is determined that the fingerprint corresponding to the storage unit data is the same as the fingerprint of the stored storage unit data, and to store the storage unit data in the storage device for storage when it is determined that the fingerprint corresponding to the storage unit data is not the same as the fingerprint of the stored storage unit data.

According to the present invention, the processing load in deduplication can be reduced.

BRIEF DESCRIPTION OF THE DRAWINGS

FIG. 7 is a configuration diagram of a content index table according to the first embodiment;

FIG. 10 is a configuration diagram of a BC block storage destination setting screen according to the first embodiment;

DESCRIPTION OF THE PREFERRED EMBODIMENTS

Figure 1:
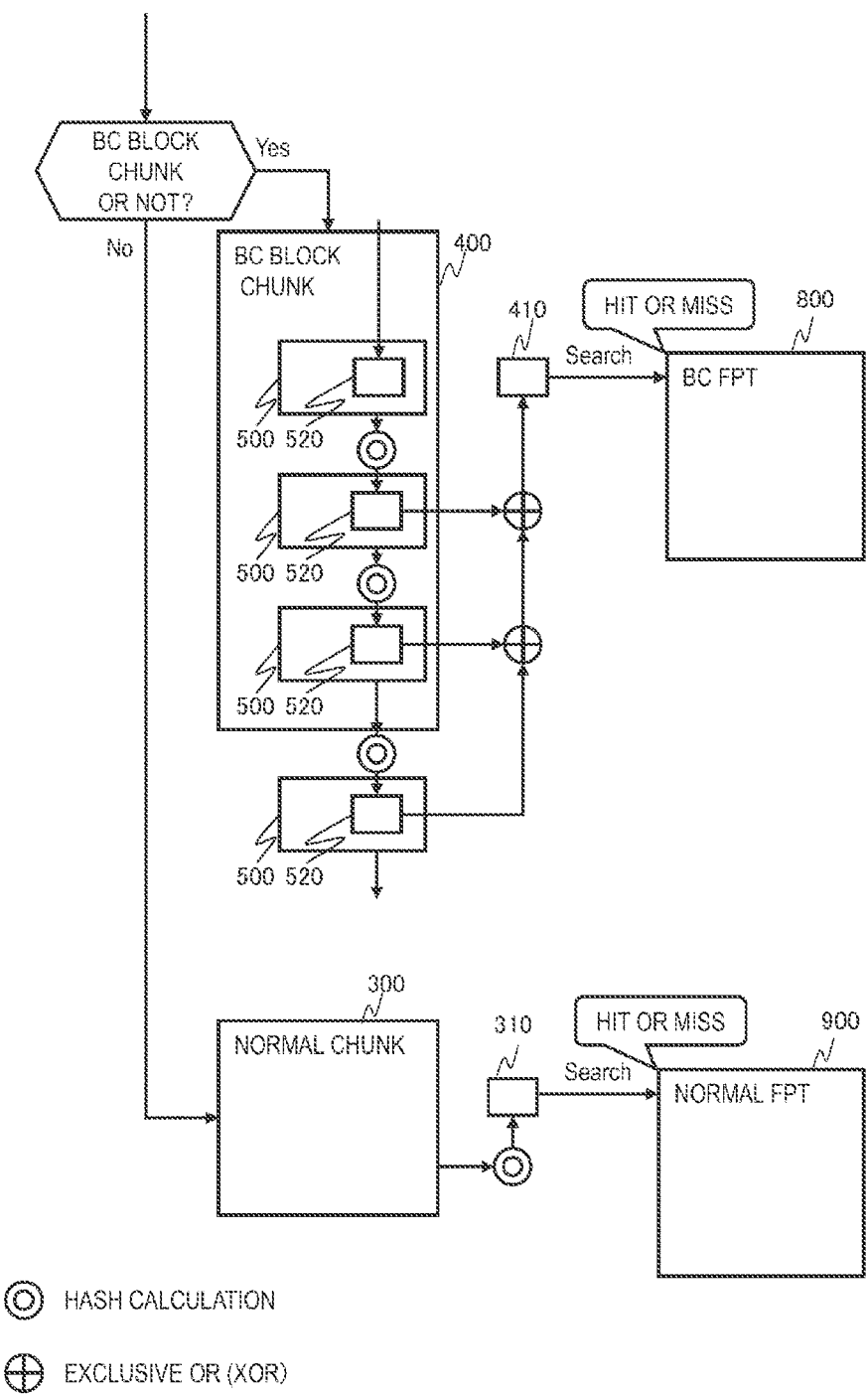
FIG. 1 is a diagram describing an outline of a first embodiment.

Embodiments will be described referring to the drawings. Note that, the embodiments described below do not limit the invention according to the claims, and all of elements and combinations thereof described in the embodiments are not necessarily essential to the solution to the problem.

In the following description, information may be described in terms of the expression "AAA table" or "AAA form", and may also be represented by any data structure. In other words, in order to show that the information does not depend on the data structure, "AAA table", "AAA form" can be referred to as "AAA information".

Further, in the following description, a "processor unit" includes one or more processors. At least one processor is typically a microprocessor such as a Central Processing Unit (CPU). Each of the one or more processors may be a single core or a multi core. The processor may include a hardware circuit that performs a part of or all of the processing.

In addition, in the following description, there is a case where the processing is described by making a "program" as a subject of operation. However, since the program is executed by a processor unit while appropriately using at least one of a storage unit and an interface unit to perform predetermined processing, the operation subject of the processing may be the processor unit (or a computer or a computer system having the processor unit). The program may be installed in a computer from a program source. The program source may be, for example, a program distribution server or a storage media readable by the computer. Further, in the following description, two or more programs may be realized as one program, or one program may be realized as two or more programs. In addition, at least part of the processing realized by executing the program may be realized by a hardware circuit (for example, Application Specific Integrated Circuit (ASIC) or Field-Programmable Gate Array (FPGA)).

First, an outline of a first embodiment will be described. FIG. 1 shows the outline of the first embodiment.

A storage system (also simply referred to as storage) 200 of a block chain system (BC system) 1 according to the first embodiment holds a normal FPT 900 for a normal chunk 300 and a BC FPT 800 for a BC chunk block 400 as an FPT. At the time of duplication determination, the storage 200 detects the BC block chunk 400 which is a chunk including a plurality of BC blocks 500, acquires a hash value for each BC block 500 from each of the next BC block 500 of the BC blocks 500 constituting the BC block chunk 400, and generates an FP 410 corresponding to the BC block chunk 400 based on the hash values acquired. The storage 200 searches for the generated FP 410 referring to the BC FPT 800 and performs the duplication determination according to whether the same FP 410 is registered. Further, for the normal chunk 300 which is not detected as the BC block chunk 400, the storage 200 calculates an output value by a predetermined hash function using the normal chunk 300 as an input and sets it as a normal FP 310, performs the duplication determination according to whether the normal FP 310 is registered referring to the FPT 900. Then, the storage 200 performs storage of data and the like according to a result of duplication determination.

Next, the first embodiment will be described in detail.

Figure 2:
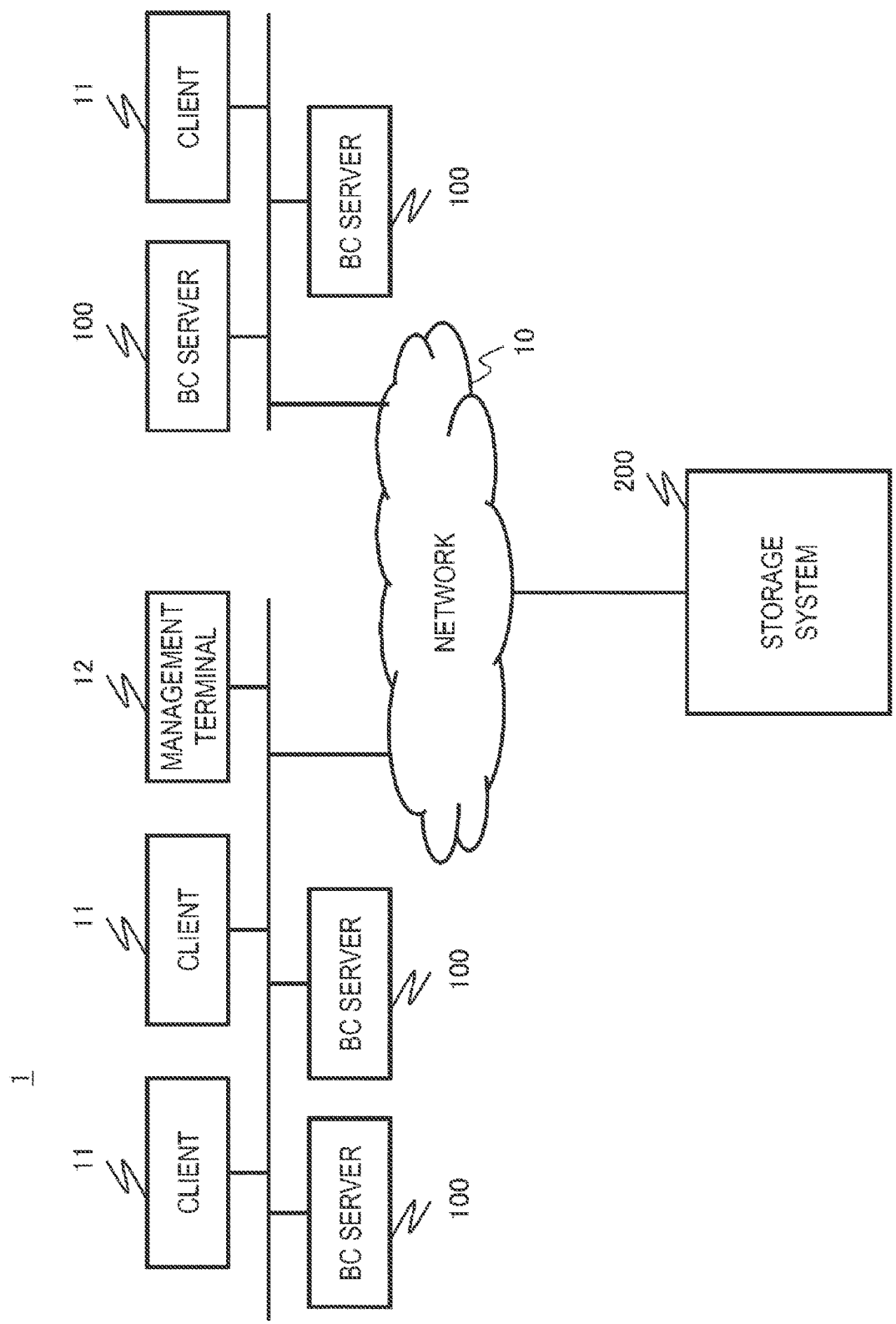
FIG. 2 is an overall configuration diagram of a block chain system according to the first embodiment.

FIG. 2 is an overall configuration diagram of a block chain system according to the first embodiment.

The BC system 1 includes one or more clients 11, a BC server 100 as an example of one or more data deduplication devices, a storage 200 as an example of a data deduplication device, and a management terminal 12. The client 11, the BC server 100, the storage, and the management terminal 12 are mutually connected via a network 10. The network 10 may be configured by a communication line including, for example, a Wide Area Network (WAN), a Local Area Network (LAN), the Internet, or the like.

The client 11 is configured by, for example, a Personal Computer (PC), and has hardware such as a processor, a memory, an input-output device, a network interface, etc. The client 11 executes an application program utilizing a BC service that can use a BC block (an example of a data group). By executing the application program, the client 11 generates a transaction and issues the transaction to the BC server 100. Note that, the BC server 100 and the client 11 may be realized by the same device by operating the application program on the BC server 100, and the management terminal 12 and the client 11 may be realized by the same device by operating the application program on the management terminal 12. Note that, the plurality of BC servers 100 may be distributed and managed in a plurality of organizations.

The management terminal 12 is configured by, for example, a PC, and is a computer which performs a management operation to the storage 200, the BC server 100, and the like. The management terminal 12 includes an input-output device such as a keyboard and a display, and an administrator can perform a setting instruction to the storage 200 and the BC server 100 via the input-output device. Further, the management terminal 12 can display a status of the storage 200 and the BC server 100 on the output device. Note that, the management terminal 12 may be incorporated in the storage 200.

Figure 3:
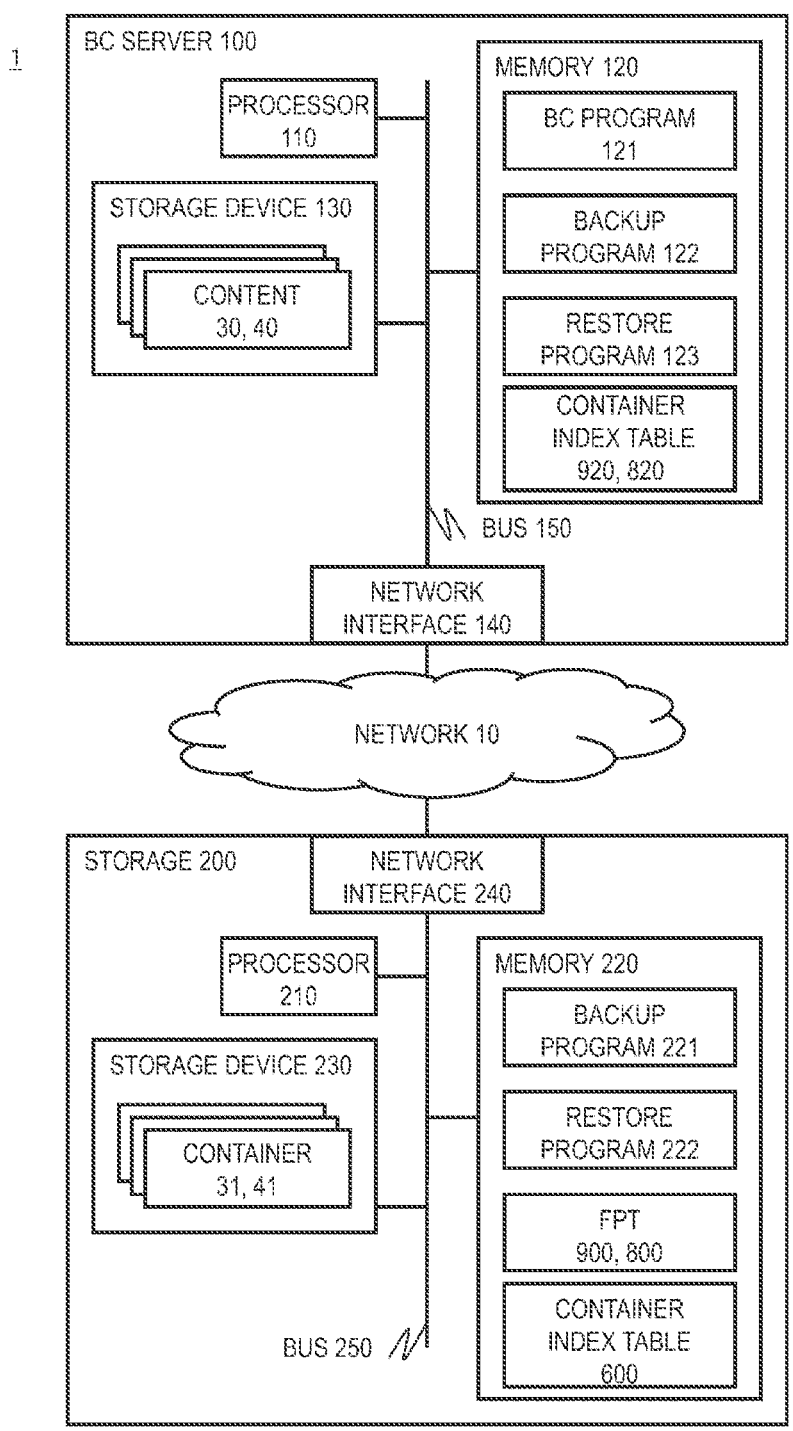
FIG. 3 is a configuration diagram of a BC server and a storage system according to the first embodiment.

FIG. 3 is a configuration diagram of a BC server and a storage system according to the first embodiment.

The BC server 100 is a computer that provides a BC service to the client 11. The BC server 100 includes, for example, a processor 110 as an example of a processor unit, a memory 120, a storage device 130, and a network interface 140. The processor 110, the memory 120, the storage device 130, and the network interface 140 are interconnected via a bus 150.

The processor 110 functions as an arithmetic device including, for example, a CPU and controls operation of the BC server 100 according to programs stored in the memory 120, arithmetic parameters, and the like.

The memory 120 is, for example, a Random Access Memory (RAM), and the BC server 100 stores a BC program 121 for providing the BC service to the client 11. Further, the memory 120 stores a backup program 122 and a restore program 123. Further, the memory 120 is used to store various information read from the storage device 130 or used as a work memory of the processor 110.

Further, the memory 120 stores container index tables 920, 820 referred to as duplication determination information when the backup program 122 and the restore program 123 are executed. Note that, the container index tables 920, 820 may be stored in the storage device 130 and may be rolled in to the memory 120 as necessary when referring to the backup program 122 and the restore program 123.

The storage device 130 is, for example, a Hard Disk Drive (HDD), a Solid State Drive (SSD), and the like, and stores various software and management information, content data that can be backup data (storage target data), and the like. Note that, the BC program 121, the backup program 122, and the restore program 123 may be stored in the storage device 130, and these programs when being executed by the processor 110 may be read from the storage device 130 to the memory 120.

The BC program 121, when executed by the processor 110, receives a transaction which is transaction data (an example of management data) from the client 11, and performs agreement formation related to the receipt of the transaction with another BC server 100 participating in the BC system 1, generates a BC block (data group) 500 including a transaction, implements processing of committing the transaction to a database of the BC system 1, and notifies the client 11 of the processing result of the transaction.

The backup program 122, when executed by the processor 110, provides a function of performing data processing such as determination of backup target data (backup data) and duplication determination processing, and sends backup data to the storage 200 via the network interface 140. Further, the backup program 122 receives information necessary for duplication determination from the storage 200 via the network interface 140.

The restore program 123, when executed by the processor 110, receives backup data necessary for the restore processing from the storage 200 via the network interface 140 and performs restoration (restore) of original data.

The storage 200 is a device (computer) that stores data, including a processor 210 as an example of the processor unit, a memory 220, a storage device 230 as an example of a storage device for storage, and a network interface 240. The processor 210, the memory 220, the storage device 230, and the network interface 240 are interconnected via a bus 250.

The processor 210 functions as an arithmetic device including a CPU and the like, and controls the storage 200 according to programs and arithmetic parameters stored in the memory 220.

The memory 220 is, for example, a Random Access Memory (RAM), and stores a backup program 221 and a restore program 222 on the storage 200 side. The memory 220 is used to store various information read from the storage device 230 or used as a work memory of the processor 210.

The memory 220 stores FPTs 900, 800, which are referred to as duplication determination information referred to when the backup program 221 and the restore program 222 are executed, and a content index table 600 used for restoring the backup data. The FPTs 900, 800 and the content index table 600 may be stored in the storage device 230 and may be rolled in to the memory 220 as necessary when referring to the backup program 221 and the restore program 222.

The storage device 230 is, for example, a Hard Disk Drive (HDD), a Solid State Drive (SSD) and the like, and stores various software and management information, a container 31 which is data after the backup processing, data of a BC block container 41, and the like.

The backup program 221, when executed by the processor 210, performs deduplication processing on the backup target data received from the BC server 100 and stores the data after the deduplication processing in the storage device 230. Further, the backup program 221, when executed by the processor 210, sends information necessary for duplication determination processing to the BC server 100 via the network interface 240.

The restore program 222, when executed by the processor 210, receives a restore request from the BC server 100, reads corresponding data from the storage device 230, and transfers the corresponding data to the BC server 100 via the network interface 240.

Next, an outline of a deduplication function according to the present embodiment will be described.

In the present embodiment, the backup program 122 of the BC server 100 and the backup program 221 of the storage 200 are equipped with a processing function of reducing a data volume of the backup target data. The processing function of reducing the data volume includes, for example, file compression processing and deduplication processing. The file compression processing is a processing of reducing data volume by contracting data segment (unit data) of same contents included in one file. Meanwhile, the deduplication processing is a processing of reducing a total amount of data stored in a file system or a storage system by contracting the same data segment detected among a plurality of files (contents).

Figure 4:
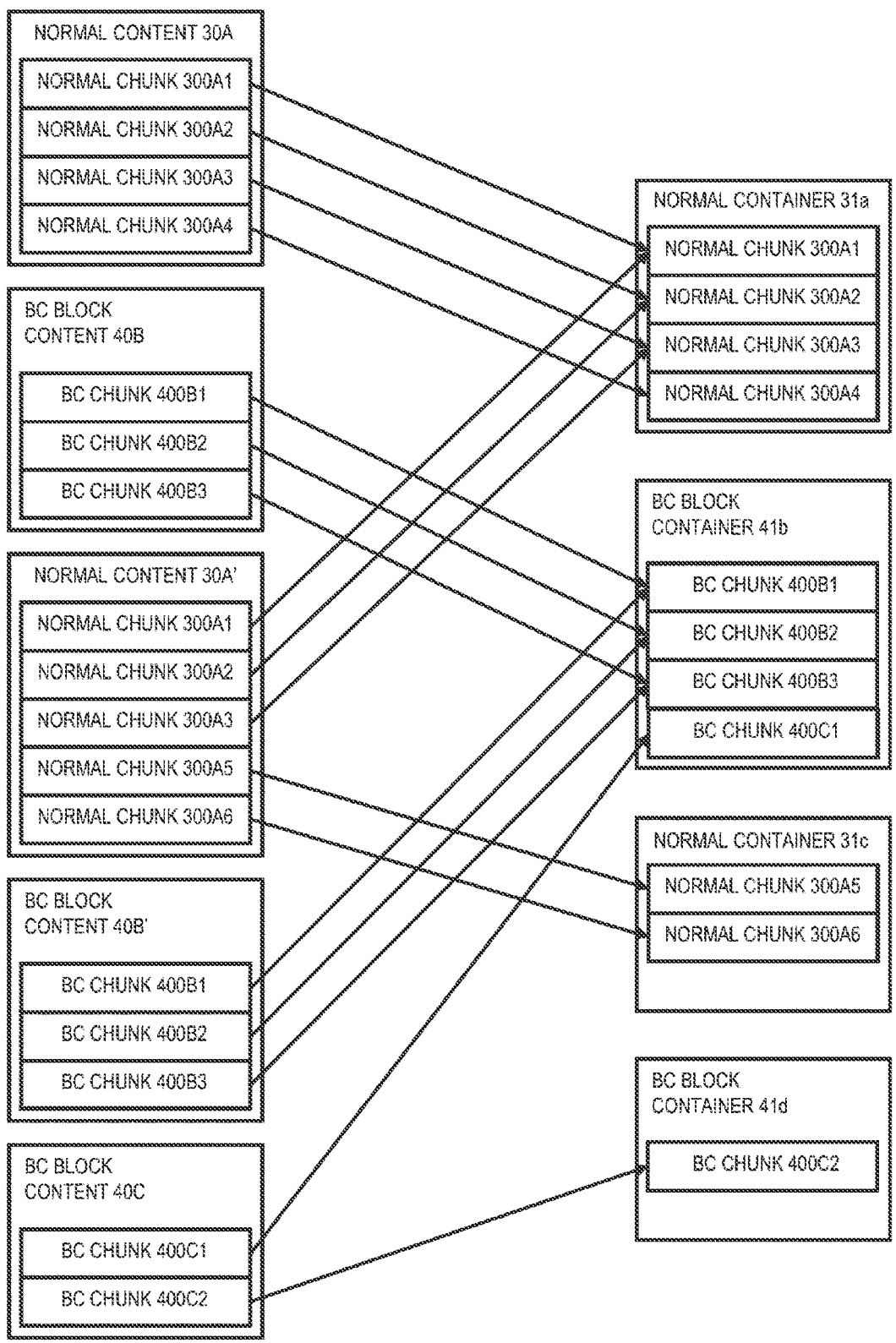
FIG. 4 shows deduplication according to the first embodiment.

FIG. 4 is a diagram describing deduplication according to the first embodiment. FIG. 4 shows a relationship between backup target data and data after being contracted by the deduplication processing.

In the present embodiment, a data segment (an example of storage unit data) which is a unit for performing deduplication with respect to backup target data is referred to as "chunk", and data that collects a plurality of chunks is referred to as a "container". Further, logically collected data which is a unit stored in the storage devices 130, 230 is referred to as "content" (an example of a data set). In addition to a normal file, contents include files contracted from normal files such as an archive file, a backup file, and a virtual volume file.

In the present embodiment, one container is created such that mutually highly relevant chunks are aggregated. For example, by defining a number of chunks that can be stored in the container and including the chunks generated from the same container which are collected by an allowable number in the same container, it is possible to create a container including highly relevant chunks. For example, as shown in FIG. 4, each BC block chunk (400B1 to 400B3) of the BC block content 40B is stored in the BC block container 41b. By constituting the container with highly relevant chunks in this manner, for example, when restoring the content in the restore processing, a plurality of chunks constituting the content can be acquired by reading a single container. Therefore, a reduction in the number of times of reading from the storage device 230 can be expected and the restore processing can be quickly performed.

In the present embodiment, in order to improve the efficiency of the duplication determination processing, the content is separately processed into BC block content 40 including the BC block 500 and other normal content 30. Further, the chunk is divided into a BC block chunk 400 including the BC block 500 and the normal chunk (another type of storage unit data) 300 which is another chunk, a container including the BC block chunk 400 is a BC block container 41 and a container including the normal chunk 300 is a normal container 31.

In the present embodiment, as shown in FIG. 4, the same BC block chunks 400 (400B1 to 400B3) in the plurality of BC block contents 40 (40B and 40B') are stored one by one in the same BC block container 41b. Therefore, the same BC block chunks 400 can be prevented from being duplicatedly stored in the storage device 230. Further, the same normal chunks 300 (300A1 to 300A3) in the normal contents 30 (30A, 30A') are similarly stored one by one in the normal container 31a. Therefore, the same normal chunks 300 can be prevented from being redundantly stored in the storage device 230.

Next, a data structure of the BC block content 40 and the BC block 500 stored in the storage device 130 will be described.

Figure 5:
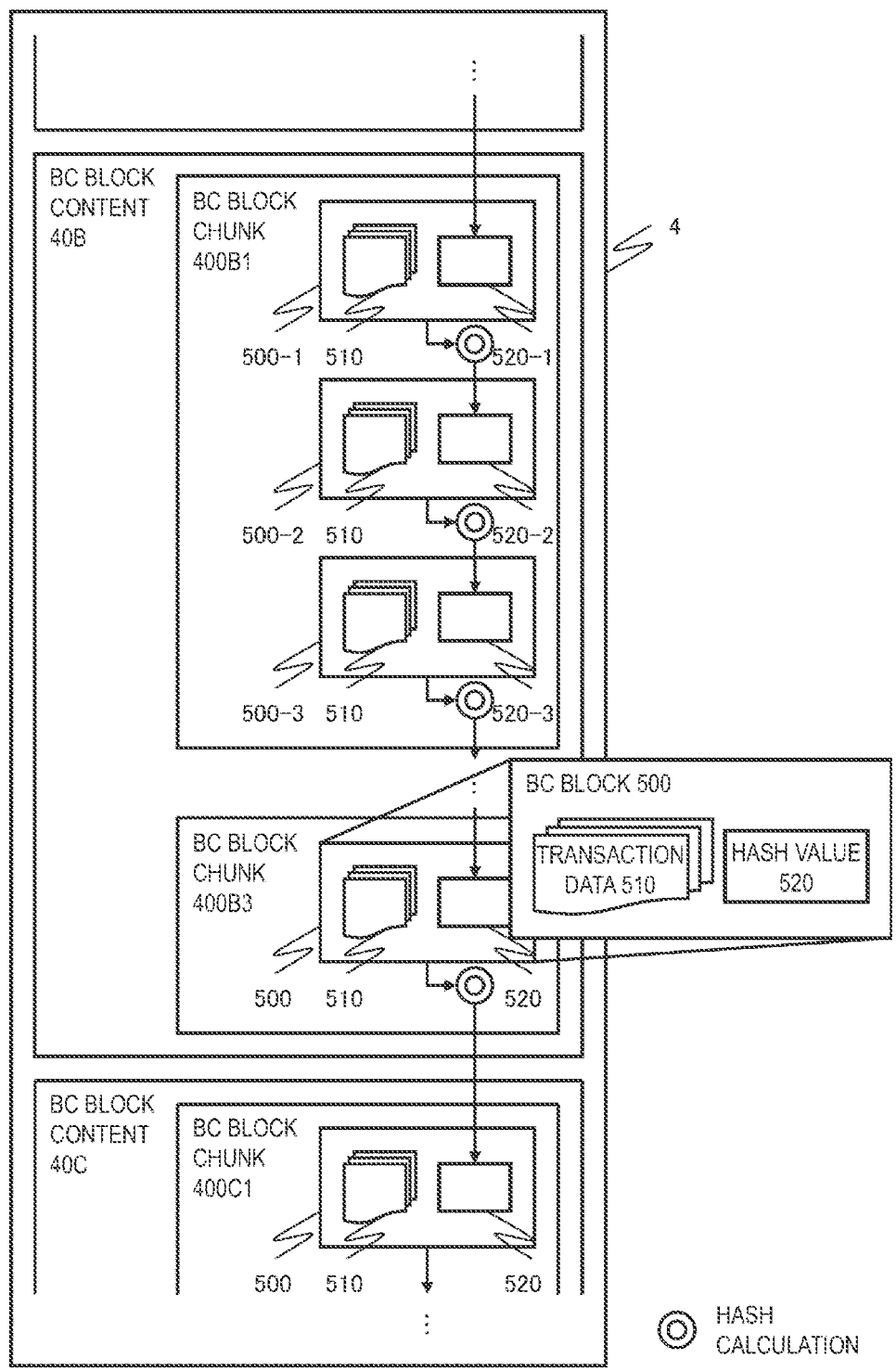
FIG. 5 shows a BC block according to the first embodiment.

FIG. 5 is a diagram describing a BC block according to the first embodiment.

The BC block 500 is a data structure for making it difficult for falsification of transaction data (an example of management data) 510 in the BC system 1, and is a data including one or more transaction data 510 and a hash (hash value) 520 calculated from the BC block 500 previously generated. According to the structure, since the hash 520 of a certain BC block 500 is included in the next BC block 500, when falsification occurred at the BC block 500, consistency between the hash 520 calculated from the BC block 500 and the hash 520 in the subsequent BC block 500 cannot be established, so that the falsification can be detected. Such a set of the BC blocks 500 which makes it difficult for falsification by holding the hash 520 of another BC block 500 in the BC block 500 is referred to as a "chain". In a chain 4, since all the BC blocks 500 are copied to all the BC servers 100 constituting the BC system 1, when the falsification of the BC block 500 occurs by one BC server 100, restoration is possible by acquiring the BC block 500 from another BC server 100. The BC block 500 is assigned with a continuous identifier in a generated order, and the generation order of the BC block 500 can be determined by the identifier.

The BC block 500 is stored in the storage device 130 as a file including one or more BC blocks 500. The file is the BC block content 40. In the deduplication processing, the BC block content 40 is divided into chunks (BC block chunks 400) as units of deduplication. However, when divided into the BC block chunks 400, the BC block content 40 is divided in accordance with the boundary of the BC block 500. Specifically, the BC block chunk 400 is divided such that one or more integer BC blocks 500 are stored. The chunk 400 generated from the BC block content 40 may include a BC block chunk 400 constituting only the BC block 500 and a normal chunk 300 constituting data other than the BC block 500. As data other than the BC block 500 in the BC block content 40, for example, there are data corresponding to header, footer, and the like.

In general, the size of the chunk is several kilobytes or more. For this reason, large processing time and cost are required to perform comparison of the whole chunk in the duplication determination processing between all chucks.

Therefore, the storage 200 of the present embodiment uses a message digest of the chunk to reduce the processing time and cost. The message digest is a technique of outputting a digest of a predetermined fixed length for data input of an arbitrary length. Here, the output result by the message digest is referred to as a "Finger Print (FP): fingerprint". In the present embodiment, the normal FP calculated from the normal chunk 300 and the FP 410 calculated from the BC block chunk 400 are used selectively.

Figure 6:
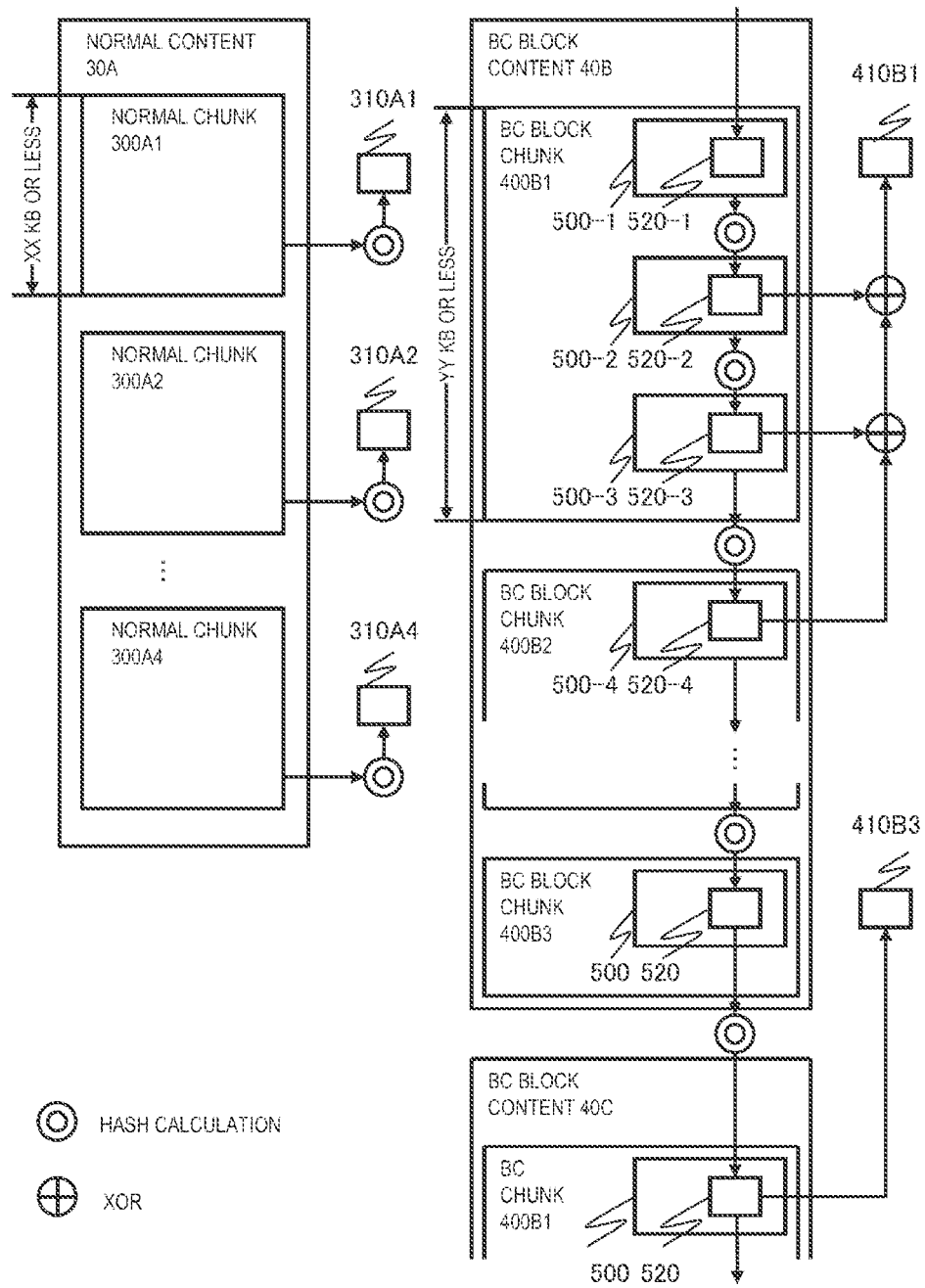
FIG. 6 shows a calculation method of FP according to the first embodiment.

FIG. 6 is a diagram describing a calculation method of FP according to the first embodiment.

First, a method of generating a normal FP 310 will be described. In the present embodiment, the normal FP 310 is an output obtained by a hash function (for example, SHA-2, SHA-3) having strong collision resistance with data of a normal chunk 300 (for example, a predetermined data length or less) as an input. By using the hash function having such strong collision resistance for the message digest, it is possible to prevent incorrect duplication determination for chunks of different contents.

Next, a method of generating an FP 410 will be described. As described above, the BC block chunk 400 is configured by one or more BC blocks 500, and the hash 520 of each BC block 500 is stored in the BC block 500 in the following order.

Therefore, hashes 520 of all the BC blocks 500 constituting the BC block chunk 400 are acquired from the BC block 500 next to each BC block 500, and the FP 410 of the BC block chunk 400 is determined (calculated) based on the acquired plurality of hashes 520. For example, when calculating an FP 410B1 of the BC block chunk 400B1 in FIG. 6, the hashes 520-2, 520-3, and 520-4 are acquired from the next BC block of each of the BC blocks 500-1, 500-2 and 500-3, that is, the BC block 500-2, 500-3, and 500-4, and the FP 410B1 is generated based on the acquired hashes 520-2, 520-3, and 520-4.

As a method of generating the FP 410 of the BC block chunk 400 from the acquired plurality of hashes 520, for example, the FP 410 may be a result of exclusive-OR (XOR) of the plurality of hashes 520; the FP 410 may be one hash calculated by a predetermined hash function in which the plurality of hashes 520 may be input; and the FP 410 may be a result of joining values of predetermined parts of the plurality of hashes (for example, a range of a predetermined byte from the beginning).

Here, a storage location of the BC block 500 next to a certain BC block is determined by a BC program 121, for example, stored in the next storage area which is continuous with the storage area in the BC block content 40 including a certain BC block 500. Note that, if the hash value is not calculated for reasons including the next BC block 500 being not created, the BC block 500 may calculate a hash using a predetermined hash function using the BC block 500 as an input, and the hash may be used as the FP 410.

Note that, the chunk size may be changed between the normal chunk 300 and the BC block chunk 400. For example, the normal chunk 300 may be 4 KB or less and the BC block chunk 400 may be 128 KB or less, and an upper limit may be set to different sizes. In general, in the deduplication processing, as the size of the chunk is smaller, duplicate data is more likely to occur, and the data reduction effect is greater. For example, when duplication determination processing is performed on contents with a part thereof being changed from stored contents, only chunks including the changed part are handled as non-duplication data, but at the time, the smaller the size of the chunk, the smaller the size of data handled as the non-duplication data. However, since the BC block chunk 400 is expected to completely match the BC block 500 copied between nodes, it is expected that contents with different parts are difficult to occur and even if the chunk size is increased, the data reduction effect does not decrease.

Next, a configuration of the FPT in the present embodiment will be described.

There are two types of FPT in the present embodiment: the normal FPT 900 used for the duplication determination processing of the normal chunk 300 and the BC FPT 800 used for the duplication determination processing of the BC block chunk 400.

Figure 8:
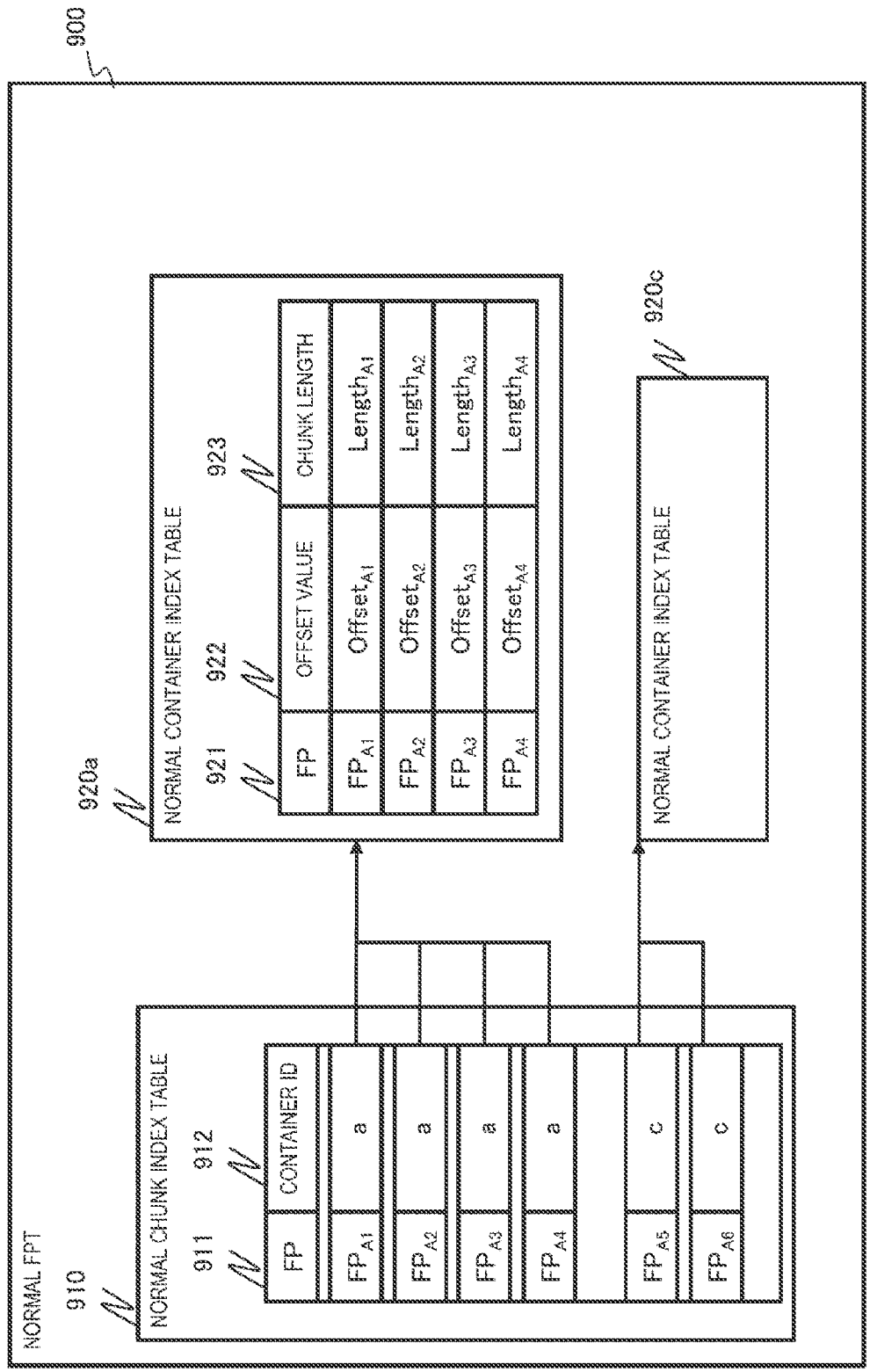
FIG. 8 is a configuration diagram of a normal FPT according to the first embodiment.

FIG. 8 is a configuration diagram of a normal FPT according to the first embodiment.

The normal FPT 900 includes a normal chunk index table 910 and one or more normal container index tables 920 (920a, 920c). The normal container index table 920 is created by the normal container 31 as a unit and is a table used for managing the normal chunk 300 (stored storage unit data) in the normal container 31 stored in the storage device 230. The normal chunk index table 910 is a table used for managing the normal container 31 at a storage destination of the normal chunk 300 stored in the storage device 230. Here, the normal chunk index table 910 and the normal container index table 920 are examples of second fingerprint information.

The normal container index table 920 stores an entry corresponding to each normal chunk 300 in the normal container stored in the storage device 230. Entries of the normal container index table 920 include items of an FP 921, an offset value 922, and a chunk length 923. The FP 921 stores a fingerprint of the normal chunk 300 corresponding to the entry. The offset value 922 stores an offset value showing a head position in the normal container of the chunk corresponding to the entry. The chunk length 923 stores a value representing a length of the normal chunk 300 corresponding to the entry.

The normal chunk index table 910 stores an entry corresponding to each normal chunk 300 stored in the storage device 230. Entries in the normal chunk index table 910 include items of FP 911 and a container ID 912. The FP 911 stores the normal FP 310 of the normal chunk 300 corresponding to the entry. The container ID 912 stores an identifier (container ID) representing the normal container 31 in which the normal chunk 300 corresponding to the entry is stored. The identifier stored in the container ID 912 has a function as pointer information for referring to the normal container index table 920 of the corresponding container. For example, the normal container index table 920 corresponding to the container ID of the container ID 912 is managed by a common identifier referred to as a Universally Unique Identifier (UUID).

Figure 9:
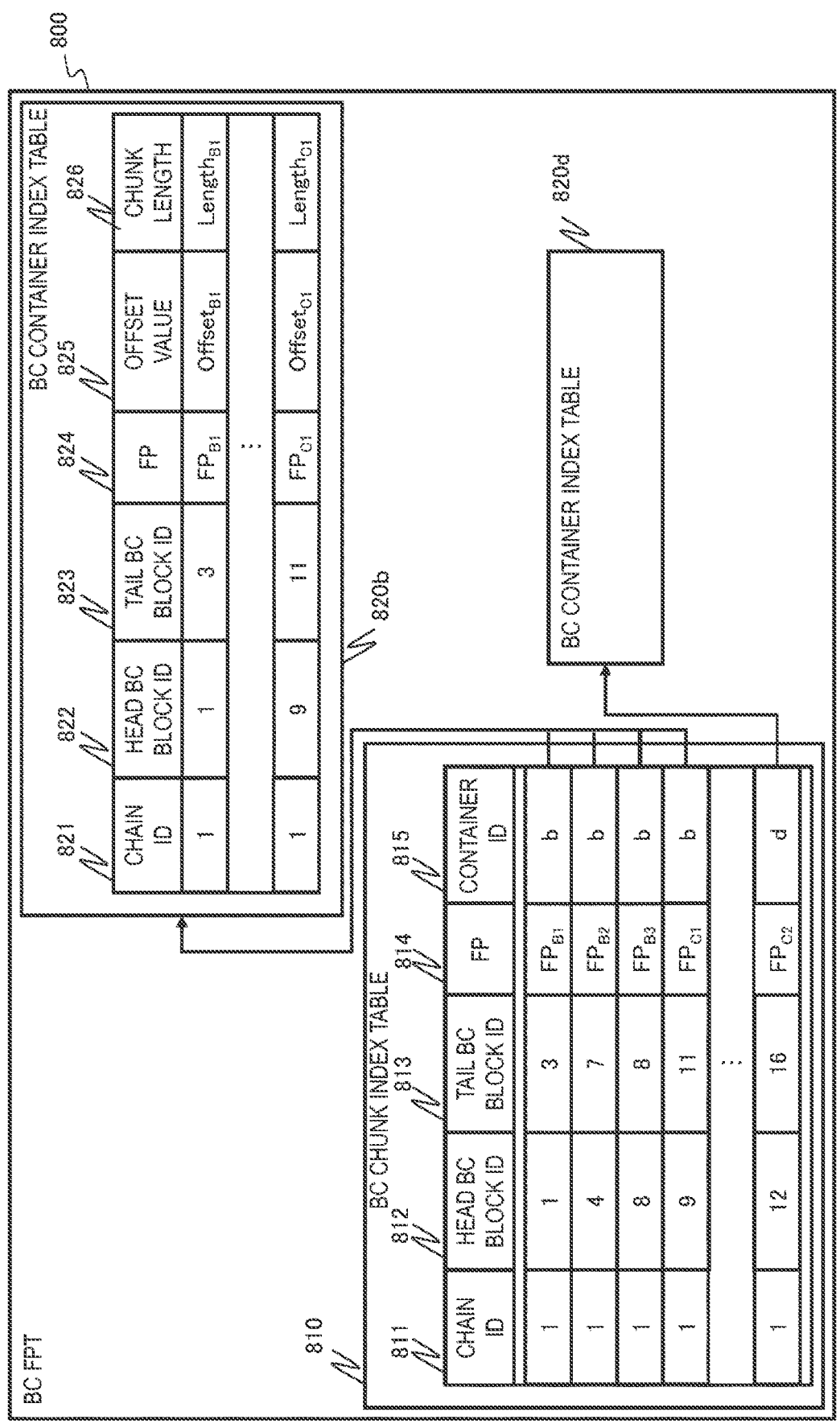
FIG. 9 is a configuration diagram of a BC FPT according to the first embodiment.

FIG. 9 is a configuration diagram of the BC FPT according to the first embodiment.

The BC FPT 800 includes a BC chunk index table 810 and a BC container index table 820. The BC container index table 820 is created by a BC block container 41 stored in the storage device 230 as a unit and is a table used for managing the BC block chunk 400 in the BC block container 41. The BC chunk index table 810 is a table used for managing the BC block container 41 at a storage destination of the BC block chunk 400 stored in the storage device 230. Here, the BC chunk index table 810 and the BC container index table 820 are examples of the fingerprint information and first fingerprint information.

The BC container index table 820 stores an entry corresponding to each BC block chunk 400 (stored storage unit data) stored in the storage device 230. Entries of the BC container index table 820 include items of a chain ID 821, a head BC block ID 822, a tail BC block ID 823, an FP 824, an offset value 825, and a chunk length 826. The chain ID 821 stores an identifier (chain ID) of the chain 4 to which the BC block 500 constituting the BC block chunk 400 corresponding to the entry belongs. The head BC block ID 822 stores an identifier (BC block ID) of the head BC block 500 among the BC blocks 500 constituting the BC block chunk 400 corresponding to the entry. The tail BC block ID 823 stores an identifier of the tail BC block 500 among the BC blocks 500 constituting the BC block chunk 400 corresponding to the entry. As an identifier of the BC block 500, since continuous values are assigned in an order of generating the BC blocks, identifiers of all BC blocks 500 constituting the BC block chunk 400 can be specified by identifiers of the head and the tail. The FP 824 stores an FP corresponding to the BC block chunk 400. The offset value 825 stores an offset value showing a head position in the BC block container 41 of the BC block chunk 400 corresponding to the entry. The chunk length 826 stores a value representing a length of the BC block chunk 400 corresponding to the entry.

The BC chunk index table 810 stores an entry corresponding to each BC block chunk 400 (stored storage unit data) stored in the storage device 230. Entries of the BC chunk index table 810 include items of a chain ID 811, a head BC block ID 812, a tail BC block ID 813, an FP 814, and a container ID 815. The chain ID 811 stores an identifier (chain ID) of the chain 4 to which the BC block 500 constituting the BC block chunk 400 corresponding to the entry belongs. The head BC block ID 812 stores an identifier (BC block ID) of the head BC block 500 among the BC blocks 500 constituting the BC block chunk 400 corresponding to the entry. The tail BC block ID 813 stores an identifier of the tail BC block 500 among the BC blocks 500 constituting the BC block chunk 400 corresponding to the entry. The FP 814 stores an FP corresponding to the BC block chunk 400. The container ID 815 stores an identifier (container ID) representing the BC block container 41 in which the BC block chunk 400 corresponding to the entry is stored.

The BC FPT 800 in the present embodiment includes a chain ID, a head BC block ID, and a tail BC block ID so that the BC block 500 constituting the BC block chunk 400 can be identified. Since the BC block 500 is assigned with an identifier based on a generation order, by using the head BC block ID and the tail BC block ID and collectively storing the continuous BC block chunks 400 of the identifiers of the BC block 500 to be configured and the management information thereof, an effect of reducing an access frequency to the storage device 230 due to locality is expected. For example, by sorting the entries of the BC chunk index table 810 and storing the same by values of the chain ID 811, the head BC block ID 812, and the tail BC block ID 813, the reference of the BC chunk index table 810 related to the continuous BC blocks 500 can be completed with one access to the continuous area. Note that, the BC FPT 800 may take the same configuration as that of the FPT 900, and may be a single FPT combining the BC FPT 800 and the normal FPT 900.

Next, a content index table 600 and a BC block content index table 700 used at the time of executing the restore processing will be described.

FIG. 7 is a configuration diagram of a content index table according to the first embodiment.

The content index tables 600 (600A, 600B) are tables created for each content, and are tables used for managing chunks included in the contents. The content index tables 600 store an entry corresponding to each chunk.

Entries of the content index tables 600 include items of a chunk ID 601, an FP 602, a container ID 603, an offset 604, a chunk length 605, and a BC block chunk determination 606.

The chunk ID 601 stores an identifier (chunk ID) of the chunk corresponding to the entry. The FP 602 stores an FP of the chunk corresponding to the entry. The container ID 603 stores an identifier of a container including a chunk corresponding to the entry. The offset 604 stores information (offset value) indicating a position (offset) in the content of the chunk corresponding to the entry. The chunk length 605 stores information representing a length of the chunk corresponding to the entry. The BC block chunk determination 606 stores information (chunk determination flag) indicating whether the chunk corresponding to the entry is the BC block chunk 400 or the normal chunk 300. The BC block chunk determination 606 stores "True" as long as the chunk corresponding to the entry is the BC block chunk 400 and stores "False" if the chunk corresponding to the entry is the normal chunk 300.

In the above embodiment, though the normal content 30 and the BC block content 40 are managed by the content index table 600 of the same format, the normal content 30 and the BC block content 40 may be managed by content index tables of different formats. For example, as a content index table of the BC block content 40, an item for storing an identifier of the BC block 500 included in the BC block chunk 400 constituting the BC block content 40 may be added to the entry of the content index table 600 described above.

Next, a BC block storage destination setting screen 1000 used for managing a storage location in the BC server 100 of the BC block content 40 will be described.

FIG. 10 is a configuration diagram of a BC block storage destination setting screen according to the first embodiment.

The BC block storage destination setting screen 1000 is displayed on an output device of a management terminal 12 by the management terminal 12, for example, at the time of system setting of the BC system 1. The BC block storage destination setting screen 1000 includes setting items of a BC based software 1001, a version 1002, a chain ID 1003, a non-duplication alert 1004, a server ID 1005, a storage directory 1006, and a file name 1007. The BC based software 1001 is an item used for setting a type of a BC program used in the BC system 1. The version 1002 is an item used for setting a version of the BC program used in the BC system 1. The chain ID 1003 is an item used for setting an identifier of the chain 4 to which the BC block 500 included in the BC block content for setting the storage destination belongs. The non-duplication alert 1004 is an item used for setting whether or not to make an alert at the time of non-duplication alert. The server ID 1005, the storage directory 1006, and the file name 1007 are items used for setting a storage destination of the BC block content 40. Here, values set in the server ID 1005, the storage directory 1006, and the file name 1007 are examples of data set storage destination information. The server ID 1005 is an item used for setting an identifier of the BC server 100 at the storage destination; the storage directory 1006 is an item for setting directory of the storage destination; and the file name 1007 is an item used for setting a file name of the storage destination. In the storage directory 1006 and the file name 1007, a description by regular expression may be set. In a setting example of the file name 1007 in FIG. 10, it is set to be a file name to which "blockfile_" is assigned with a six-digit number (regular expression: [0-9]{6}). Note that, the storage destination of the BC block content 40 may be set by an identifier of a storage destination provided by the storage 200 instead of a directory or a file name, for example, an identifier of a bucket as long as the storage 200 is an object storage.

Next, a processing operation of the BC system 1 according to the present embodiment will be described.

First, backup processing in the BC system 1 will be described.

Figure 11:
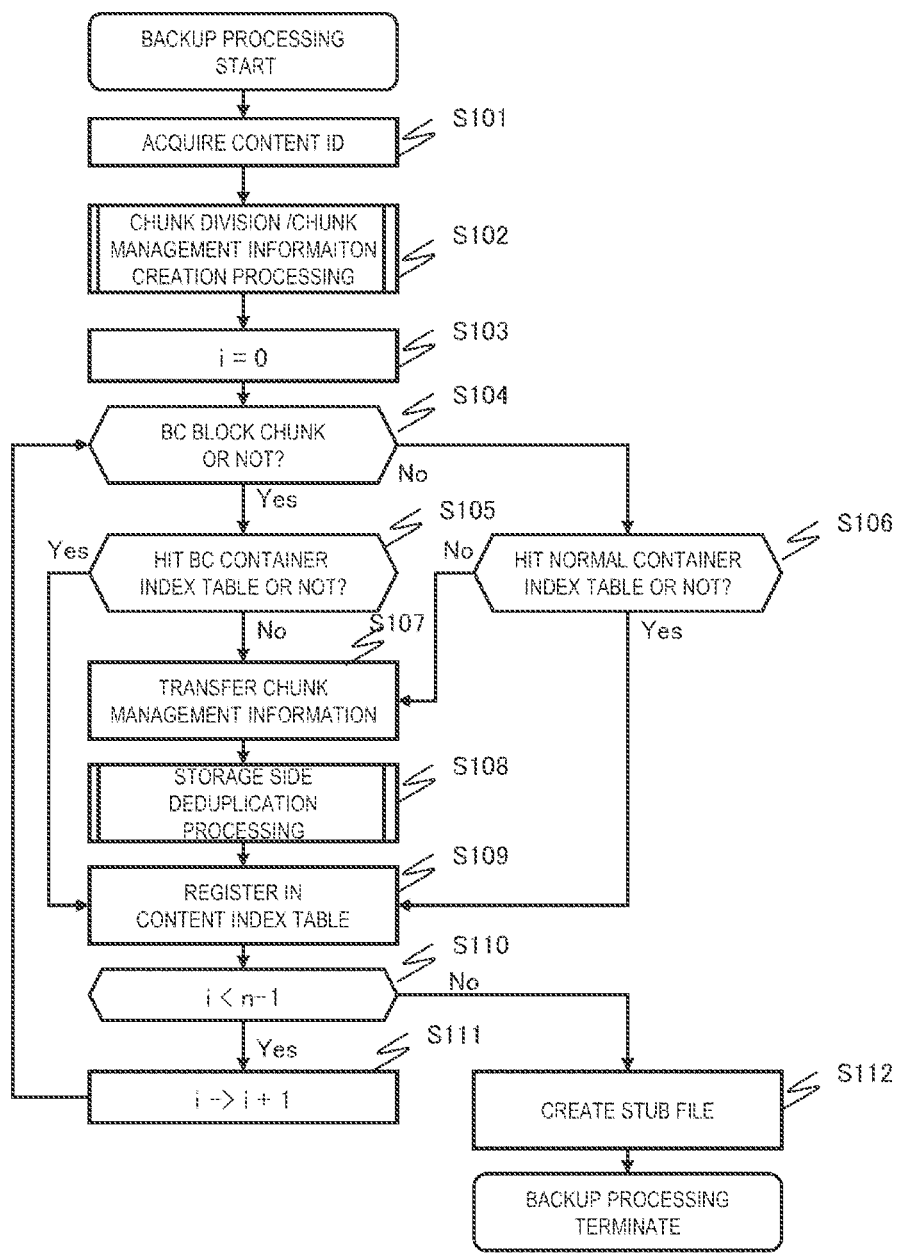
FIG. 11 is a flowchart of backup processing according to the first embodiment.

FIG. 11 is a flowchart of backup processing according to the first embodiment. FIG. 11 shows a backup processing for a content.

The backup processing is started, for example, when the BC server 100 receives a backup processing start instruction from the management terminal 12 or when the BC server 100 detects that a usage amount of the storage device 130 exceeds a predetermined threshold.

In step S101, the backup program 122 (strictly speaking, the processor 110 executing the backup program 122) of the BC server 100 acquires an identifier of a content of a backup target (target content) from the storage 200. Here, the identifier of the target content needs to be assigned with a unique value in the storage 200 in which the target content is stored from the plurality of BC servers 100, and in order to manage within the storage 200, the BC server 100 needs to send a request to the storage 200 and acquire the identifier of the target content.

Next, in step S102, the backup program 122 of the BC server 100 divides the target content into a plurality of chunks, derives an FP from each chunk, and executes a chunk division and chunk management information creation processing (referring to FIG. 12) for generating management information of each chunk. The management information includes the identifier of the content to which the chunk belongs, the FP of the chunk, a position of the chunk in the content, a chunk length, a determination flag showing whether it is a BC block chunk 400 or not; further, when the chunk is the BC block chunk 400, the management information includes a chain ID, a head BC block ID, a tail BC block ID, and the like. Note that, the chunk division number of the target content in step S102 is managed in the backup program 122. Here, in FIG. 11 and the description of FIG. 11, the chunk division number is set as n.

Next, in step S103, the backup program 122 of the BC server 100 initializes a value of a counter i that stores the number of times of execution of the following loop processing (S104 to S109) to 0. The value of the counter i represents a chunk being set as the processing target in the loop together with the number of times of execution of the loop processing; and in the loop processing in which the counter i=k, it represents that a (k+1)th chunk is set as the processing target from a head of the content.

Next, in step S104, the backup program 122 of the BC server 100 determines whether or not the chunk of the processing target (processing target chunk) in the loop processing is the BC block chunk 400, for example, based on a determination flag showing whether it is the BC block chunk 400 in the management information of the chunk created by the chunk division and chunk management information creation processing (S102).

As a result of the determination, when the processing target chunk is the BC block chunk 400 (S104: Yes), the processing moves to step S105; meanwhile, when the processing target chunk is not the BC block chunk 400 (S104: No), the processing moves to step S106.

In step S105, the backup program 122 of the BC server 100 searches for a BC container index table 820 based on the management information of the chunk created in step S102, and determines whether or not a matching entry exists. Specifically, referring to the BC container index table 820, the backup program 122 determines whether or not an entry in which the management information of the chunk matches values of the chain ID 821, the head BC block ID 822, the tail BC block ID 823, the FP 824, and the chunk length 826 exists.

As a result, it shows that there is duplicate data when an entry in which the management information matches the values (step S105: Yes) exists. Accordingly, the backup program 122 of the BC server 100 transfers the information of the matching entry to the storage 200 as information of the duplicate data, and the processing moves to step S109. Meanwhile, it shows that there is no duplicate data when an entry in which the management information matches values (step S105: No) does not exist. Accordingly, the processing moves to step S107. Note that, in the present embodiment, the chain ID 821, the head BC block ID 822, and the tail BC block ID 823 which are unique information of the BC block chunk 400 are included in the BC container index table 820, based on which an entry corresponding to the processing target chunk is searched. However, when the unique information of the BC block chunk 400 is not included in the BC container index table, which is the same as step S106 described below, it may be determined whether or not there is duplicate data by confirming that the FP and the chunk length match each other from values of the FP 824 and the chunk length 826.

In step S106, the backup program 122 of the BC server 100 searches for the normal container index table 920 based on the management information of the chunk created in step S102, and determines whether or not a matching entry exists. Specifically, the backup program 122 refers to the normal container index table 920 and determines whether or not an entry in which chunk management information matches values of the FP 921 and the chunk length 923 exists.

As a result, it shows that there is duplicate data when an entry in which the management information matches the values exists (step S106: Yes). Accordingly, the backup program 122 of the BC server 100 moves the processing to step S109; meanwhile, it shows that there is no duplicate data when an entry in which the management information matches the values does not exist (step S106: No). Accordingly, the backup program 122 of the BC server 100 moves the processing to step S107.

In step S107, the backup program 122 of the BC server 100 transfers the management information of the processing target chunk to the storage 200.

Next, in step S108, the backup program 221 of the storage 200 to which the management information of the processing target chunk is transferred in step S107 executes storage side deduplication processing (referring to FIG. 13) that performs deduplication on the processing target chunk. According to step S108, the storage 200 generates information related to a storage destination of duplicate data of the processing target chunk or information related to a storage destination of written data newly written to the storage device 230. After step S108, the backup program 221 moves the processing to step S109.

In step S109, the backup program 221 registers information related to a storage destination of the processing target chunk in the content index table 600. Specifically, the backup program 221 of the storage 200 acquires values set in the chunk ID 601, the FP 602, the offset 604, and chunk length 605 of the content index table 600 from the management information of the processing target chunk; further, acquires a value set in the container ID 603 from a storage destination information of the duplicate data or the written data; and registers a new entry including these values in the content index table 600. After step S109, the backup program 221 of the storage 200 moves the processing to step S110.

In step S110, the backup program 122 of the BC server 100 confirms whether processing for all chunks in the processing target content has been completed. Specifically, when a value of the counter i is less than n−1 (S110: Yes), which means that there is an unprocessed chunk, the backup program 122 of the BC server 100 moves the processing to step S111 to continue the backup processing; meanwhile, when the counter i is equal to or larger than n−1 (S110: No), which means that the processing of all chunks has been completed, the backup program 122 of the BC server 100 moves the processing to step S112.

In step S111, the backup program 122 of the BC server 100 changes the processing target chunk to the next chunk in the processing target content, and moves the processing to step S104. Specifically, the backup program 122 adds 1 to the value of the counter i to change the processing target chunk. For example, when the counter i=k, the processing target chunk is changed from the head of the processing target content to a (k+2)th chunk by updating to i=i+1.

In step S112, the backup program 122 of the BC server 100 stores a restore stub file in a storage position corresponding to the file of the storage device 130. The stub file includes a content identifier and the like necessary for specifying the content index table 600 corresponding to the content to be restored at the time of executing the restore processing. Note that, an object of step S112 is to store and hold information such as a content identifier necessary at the time of restoration in the storage device 130, and the storage form of the information is not limited to the stub file, and may be stored in, for example, a management table of the content identifier.

After step S112, the backup program 122 of the BC server 100 terminates the backup processing.

Next, the chunk division and chunk management information creation processing (step S102 in FIG. 11) will be described in detail.

Figure 12:
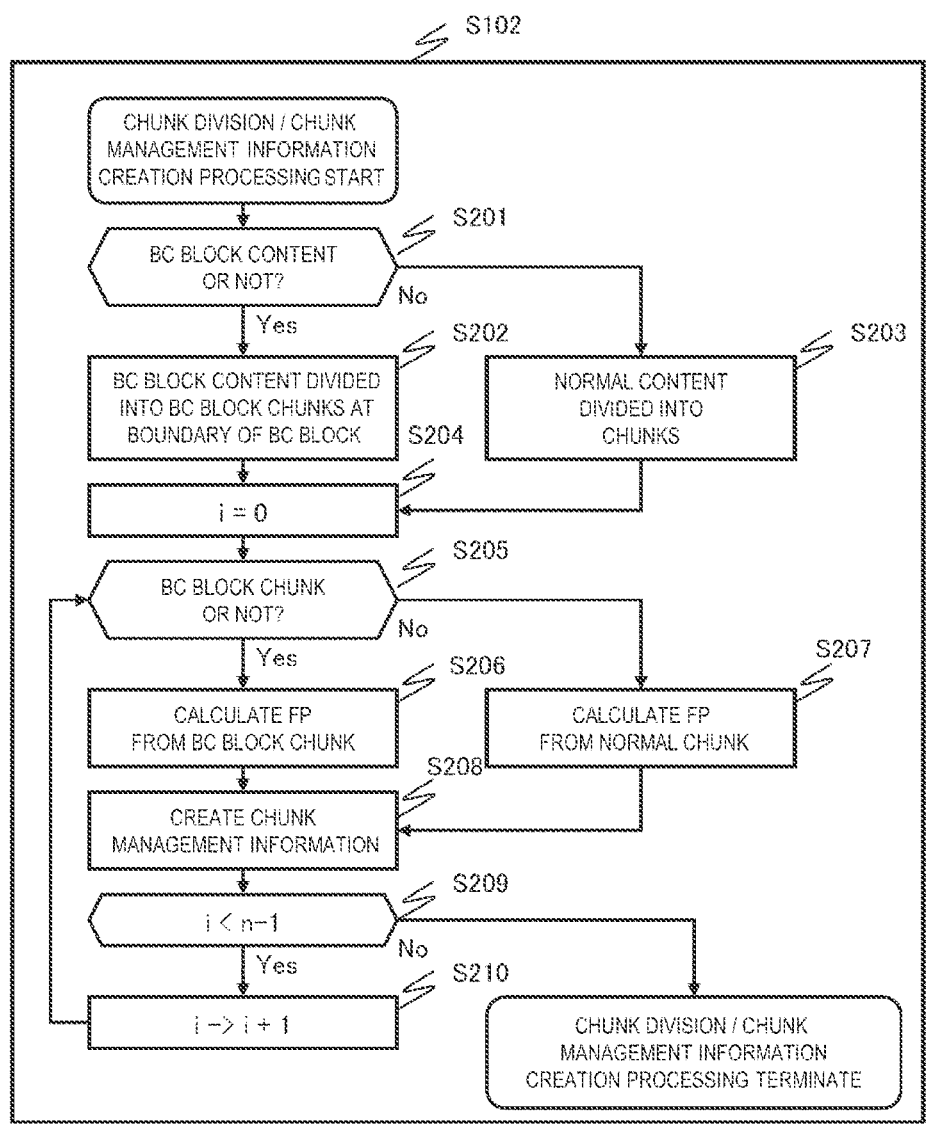
FIG. 12 is a flowchart of chunk division and chunk management information creation processing according to the first embodiment.

FIG. 12 is a flowchart of chunk division and chunk management information creation processing according to the first embodiment. Note that, FIG. 12 shows a flowchart of processing for one content.

In step S201, the backup program 122 of the BC server 100 determines whether or not the processing target content is the BC block content 40. Specifically, the backup program 122 first determines whether or not the processing target content is a candidate for the BC block content 40 based on setting on the BC block storage destination setting screen 1000. For example, the backup program 122 is stored in a directory specified in a storage directory 1006 in the BC server 100 of a server ID specified in the server ID 1005, and sets a content of the file name according to a rule specified in the file name 1007 as a candidate of the BC block content 40. Next, the backup program 122 determines whether the content is the BC block content 40 based on the BC block storage destination setting screen 1000 by confirming the content data. For example, for each BC block 500 included in the content, the BC block 500 is determined by confirming that it is in a correct format by verifying presence or absence of a fixed value included in the head of the BC block 500 and correctness of an electronic certificate assigned to the BC block 500. When it is determined that the content is the BC block content 40 (S201: Yes), the backup program 122 moves the processing to step S202; meanwhile, when the content is not the BC block content, that is, when it is determined that it is a normal content 30 (S201: No), the processing moves to step S203.

In step S202, the backup program 122 of the BC server 100 divides the BC block content 40 into BC block chunks 400. When the BC block content 40 is divided, the backup program 122 recognizes the BC block 500 included in the BC block content 40 and divides it into BC block chunks 400 in accordance with the boundary of the BC block 500, that is, divides the BC block chunk 400 such that it includes one or more integer BC blocks 400. For example, the BC block chunk 400 is determined so as to include a maximum number of BC blocks 500 within a range of a chunk size within a certain size. Note that, the BC block content 40 may be divided into normal chunks 300 when including a header or metadata other than the BC block 500, for example, data other than the BC block 500. After dividing the BC block content 40, the backup program 122 generates and holds information showing whether each chunk is the BC block chunk 400 or the normal chunk 300.

In step S203, the backup program 122 of the BC server 100 divides the normal content 30 into the normal chunks 300. The backup program 122, for example, divides the normal content 30 into the normal chunks 300 for each set size.

Here, the division number of the content into the chunks in step S202 or step S203 is managed in the backup program 122. Note that, in FIG. 12 and the description of FIG. 12, the chunk division number is set as n.

In step S204, the backup program 122 of the BC server 100 initializes a value of a counter i that stores the number of times of execution of the following loop processing (S205 to S210) to 0. The value of the counter i represents the chunk being set as the processing target in the loop together with the number of times of execution of the loop processing; and in the loop processing in which the counter i=k, it represents that the (k+1)th chunk is set as the processing target from the head of the content.

Next, in step S205, the backup program 122 of the BC server 100 determines whether or not the chunk of the processing target (processing target chunk) in the loop processing is the BC block chunk 400, for example, based on the information created in step S202 (information showing that it is a BC block chunk).

As a result of the determination, when the processing target chunk is the BC block chunk 400 (S205: Yes), the backup program 122 moves the processing to step S206; meanwhile, when the processing target chunk is not the BC block chunk 400 (S205: No), the processing moves to step S207.

In step S206, the backup program 122 of the BC server 100 calculates the FP of the processing target chunk. Since the processing target chunk in step S206 corresponds to the BC block chunk 400, the backup program 122 calculates the FP by, for example, the calculation method of the FP 410 shown in FIG. 6. Specifically, the backup program 122 first isolates the BC block chunk 400 into the BC blocks 500 constituting the BC block chunk 400. Next, the backup program 122 acquires the hash 520 corresponding to each BC block 500 from the next BC block 500 of each BC block 500 isolated. Note that, since the BC block 500 is located at the end of the BC block content 40, the hash 520 of the corresponding BC block 500 may be calculated by calculation when it is difficult to acquire the next BC block 500 or when the processing is performed before the next BC block 500 is created. Next, the backup program 122 takes XOR of the hash 520 corresponding to each BC block 500, and sets the result as the FP of the processing target chunk.

In step S207, the backup program 122 of the BC server 100 calculates the FP (normal FP) of the processing target chunk. Since the processing target chunk in step S207 corresponds to the normal chunk 300, the backup program 122 calculates the normal FP by, for example, the calculation method of the normal FP 310 shown in FIG. 6. Specifically, the backup program 122 sets all the processing target chunks (normal chunks 300) as input of a hash function and sets an output value by the hash function as a normal FP.

Next, in step S208, the backup program 122 of the BC server 100 generates management information of the processing target chunk. The management information includes the identifier of the content to which the processing target chunk belongs, the FP of the processing target chunk, a position of the processing target chunk in the content, a chunk length, information showing whether or not it is a BC block chunk 400; further, when the processing target chunk is the BC block chunk 400, the management information includes a chain ID, a head BC block ID, a tail BC block ID, and the like.

Next, in step S209, the backup program 122 of the BC server 100 confirms whether processing for all chunks in the processing target content has been completed. Specifically, when a value of the counter i is less than n−1 (S209: Yes), which means that there is an unprocessed chunk, the backup program 122 of the BC server 100 moves the processing to step S210 to continue the backup processing. Meanwhile, when the counter i is equal to or larger than n−1 (S209: No), which means that the processing of all chunks has been completed, the backup program 122 of the BC server 100 terminates the chunk division and chunk management information generation processing.

In step S210, the backup program 122 of the BC server 100 changes the processing target chunk to the next chunk in the processing target content, and moves the processing to step S205. Specifically, the backup program 122 adds 1 to the value of the counter i to change the processing target chunk. For example, when the counter i=k, by updating to i=i+1, the processing target chunk is changed from the head of the processing target content to the (k+2)th chunk.

Next, the storage side deduplication processing (step S108 in FIG. 11) will be described in detail.

Figure 13:
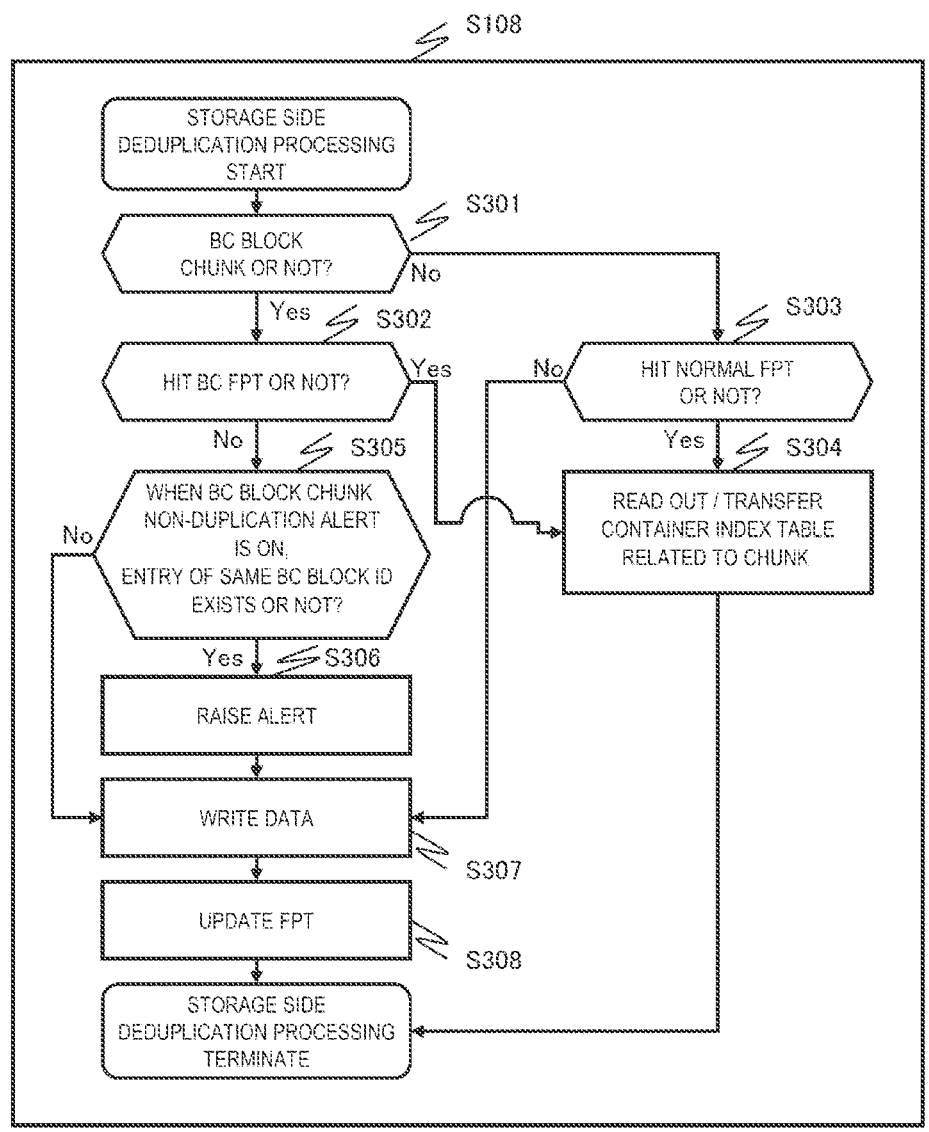
FIG. 13 is a flowchart of storage side deduplication processing according to the first embodiment.

FIG. 13 is a flowchart of storage side deduplication processing according to the first embodiment. Note that, FIG. 13 shows a flowchart of processing for one chunk.

In step S301, the backup program 221 of the storage 200 determines whether or not the processing target chunk is the BC block chunk 400. Specifically, the backup program 221 determines based on, for example, a determination flag showing whether or not it is the BC block chunk 400 in the management information of the chunk received by the storage 200 from the BC server 100 in step S107. As a result of the determination, when the processing target chunk is the BC block chunk 400 (S301: Yes), the backup program 221 moves the processing to step S302; Meanwhile, when the content is not the BC block content, that is, when it is determined that it is the normal content 30 (S301: No), the processing moves to step S303.

In step S302, the backup program 221 of the storage 200 searches for the BC FPT 800 and determines whether or not data duplicating with the processing target chunk (duplicate data) exists. Specifically, the backup program 221 first refers to the BC chunk index table 810 based on the chunk management information received from the BC server 100, and searches for an entry in which values of the chain ID 811, the head BC block ID 812, the tail BC block ID 813, and the FP 814 match the management information. When a matching entry is found, the backup program 221 reads the BC container index table 820 corresponding to the value stored in the container ID 815 of the entry. Next, the backup program 221 refers to the BC container index table 820, and searches for an entry in which values of the chain ID 821, the head BC block ID 822, the tail BC block ID 823, the FP 824, and the chunk length 826 match the management information of the processing target chunk. The backup program 221 determines that duplicate data for the processing target chunk exists when a matching entry is found, and determines that duplicate data for the processing target chunk does not exist when the matching entry is not found.

When the backup program 221 of the storage 200 determines that the duplicate data for the processing target chunk exists (S302: Yes), the backup program 221 itself holds the matching entry as the information of the duplicate data and moves the processing to step S304; meanwhile, when the backup program 221 of the storage 200 determines that the duplicate data for the processing target chunk does not exist (S302: No), that is, when the matching entry is not found in the search of the BC chunk index table 810 or the search of the BC container index table 820, the processing moves to step S305.

Note that, the present embodiment is configured such that the BC chunk index table 810 and the BC container index table 820 include the chain ID 821, the head BC block ID 822, and the tail BC block ID 823 which are unique information of the BC block chunk 400, and a matching entry of the processing target chunk and the information is searched to determine whether or not duplicate data exists. However, the BC chunk index table and the BC container index table may not include the unique information of the BC block chunk 400. In this case, entries with a matching chunk length may be searched from the BC FPT, and it may be determined that the duplicate data exists when a matching entry is found.

In step S303, the backup program 221 of the storage 200 searches for the normal container index table 920 and determines whether or not data duplicating with the processing target chunk (duplicate data) exists. Specifically, the backup program 221 first refers to the normal container index table 910 based on the chunk management information received from the BC server 100, and searches for an entry in which a value of the FP 911 matches the management information. When a matching entry is found, the backup program 221 reads the normal container index table 920 corresponding to the value stored in the container ID 912 of the entry. Next, the backup program 221 refers to the normal container index table 920 that has been read and searches for an entry in which the management information of the processing target chunk matches values of the FP 921 and the chunk length 923. The backup program 221 determines that duplicate data for the processing target chunk exists when a matching entry is found, and determines that the duplicate data does not exist when the matching entry is not found.

As a result of the determination, when the backup program 221 of the storage 200 determines that the duplicate data for the processing target chunk exists (S303: Yes), the backup program 221 itself holds the matching entry as the information of the duplicate data and moves the processing to step S304; meanwhile, when the backup program 221 of the storage 200 determines that the duplicate data for the processing target chunk does not exist (S303: No), that is, when a matching entry is not found in the search of the normal chunk index table 910 or the search of the normal container index table 920, the processing moves to step S307.

In step S304, the backup program 221 of the storage 200 transfers the BC container index table 820 including the entry matched in step S302 or the normal container index table 920 including the entry matched in step S303 to the BC server 100, and terminates the storage side deduplication processing. Here, since highly relevant data is included in the same container, chances that the chunk under the deduplication processing continuously is included in the same container are high.

Therefore, in the BC server 100 to which the BC container index table 820 or the normal container index table 920 including the matching entry is transferred, it is possible to determine the existence of the duplicate data with high accuracy by executing the processing of steps S105 and S106 in the backup processing by using the transferred BC container index table 820 or the normal container index table 920. As a result, it is possible to reduce the transfer of chunks in which duplicate data exists from the BC server 100 to the storage 200.

Note that, the backup program 221 may read the BC container index table 820 or the normal container index table 920 that is highly relevant to the BC container index table 820 or the normal container index table 920 including the matching entry and transfers the same to the BC server 100. For example, in step S304, when the processing target chunk is the BC block chunk 400, the BC container index table 820 including the information for duplication determination related to the BC block 500 of the continuous identifiers following the identifier of the BC block 500 included in the BC block chunk 400 may be transferred to the BC server 100, and in this case as well, the same effect can be expected. Further, the backup program 221 may read the strongly relevant BC container index table 820 from the storage device 230 of the storage 200 to the memory 220. In this way, it is not necessary to read the BC container index table 820 from the storage device 230 to the memory 220 in the deduplication processing of the following BC block chunk 400, so improvement of response performance can be expected.

In step S305, the backup program 221 confirms whether an alert at the time of non-duplication of the BC block chunk 400 is valid or invalid, and confirms whether or not an entry of the BC block chunk 400 including the same BC block 500 as the processing target BC block chunk 400 exists in the BC FPT 800. Here, whether the setting of the alert at the time of non-duplication of the BC block chunk 400 is valid or invalid can be confirmed based on a value set in the non-duplication alert 1004 of the block storage destination setting screen 1000. Further, whether or not the entry of the BC block chunk 400 including the same BC block 500 as the processing target BC block chunk 400 exists can be determined by whether or not an entry in which values of the chain ID 811, the head BC block ID 812, and the tail BC block ID 813 match the information of the processing target chunk exists in the BC chunk index table 810. When a matching entry exists, it can be determined that the BC block chunk 400 including the same BC block 500 has already been registered in the BC FPT 800.

When the setting of the alert is valid and the entry of the BC block chunk 400 including the same BC block 500 as the processing target BC block chunk 400 (S305: Yes) exists, the backup program 221 moves the processing to step S306; otherwise (S305: No), the processing is moved to step S307.

In step S306, the backup program 221 of the storage 200 is expected to be in a situation where the data of the BC block chunk 400 that is copied by a plurality of BC servers 100 including the same BC block 500 of the same chain 4 do not match, and an alert is raised (notified) since there is a possibility that a problem such as data falsification occurred in the BC system 1. Here, a notification destination of the alert is, for example, the BC server 100 or the management terminal 12.

In step S307, the backup program 221 of the storage 200 writes the data of the processing target chunk to the storage device 230. The writing of data of the processing target chunk to the storage device 230 is performed by methods such as additional writing to a container having an empty area, or by creating a new container and writing from the head thereof. The backup program 221 holds the container ID of the storage destination and the offset of the container as storage destination information of the written data (written data).

Next, in step S308, the backup program 221 of the storage 200 adds the information of the written data in step S307 to the FPTs (800, 900).

Specifically, the backup program 221 first adds an entry to the container index tables (820, 920). The backup program 221 adds an entry to the BC container index table 820 when the processing target chunk is the BC block chunk 400, and adds an entry to the normal container index table 920 when the processing target chunk is the normal chunk 300. Next, the backup program 221 of the storage 200 adds an entry to the chunk index tables (810, 910). The backup program 221 of the storage 200 adds an entry to the BC chunk index table 810 when the processing target chunk is the BC block chunk 400, and adds an entry to the normal chunk index table 910 when the processing target chunk is the normal chunk 300. The information of the entries added to the container index tables (820, 920) and the chunk index tables (810, 910) is determined based on the management information of the processing target chunk received from the BC server 100 and the storage destination information of the written data created at step S307. After step S308, the backup program 221 of the storage 200 terminates the storage side deduplication processing.

As described above, according to the backup processing according to the present embodiment, since calculation of the hash in the deduplication processing of the BC block chunk 400 is unnecessary or reduced, the processing load of the backup processing can be reduced and the processing performance is improved. In the above embodiment, the deduplication processing in the backup processing is described. However, the present invention is not limited thereto, and the processing can be applied as long as it is a case where data of the content on the BC server 100 is deduplicated and written in the storage 200. For example, the processing can be applied to a case where the content data at the time of tiering is moved from the BC server 100 to the storage 200 or a case where the content data by a writing request from the BC server 100 is written to the storage 200.

Next, a restore processing in the BC system 1 according to the present embodiment will be described.

Figure 14:
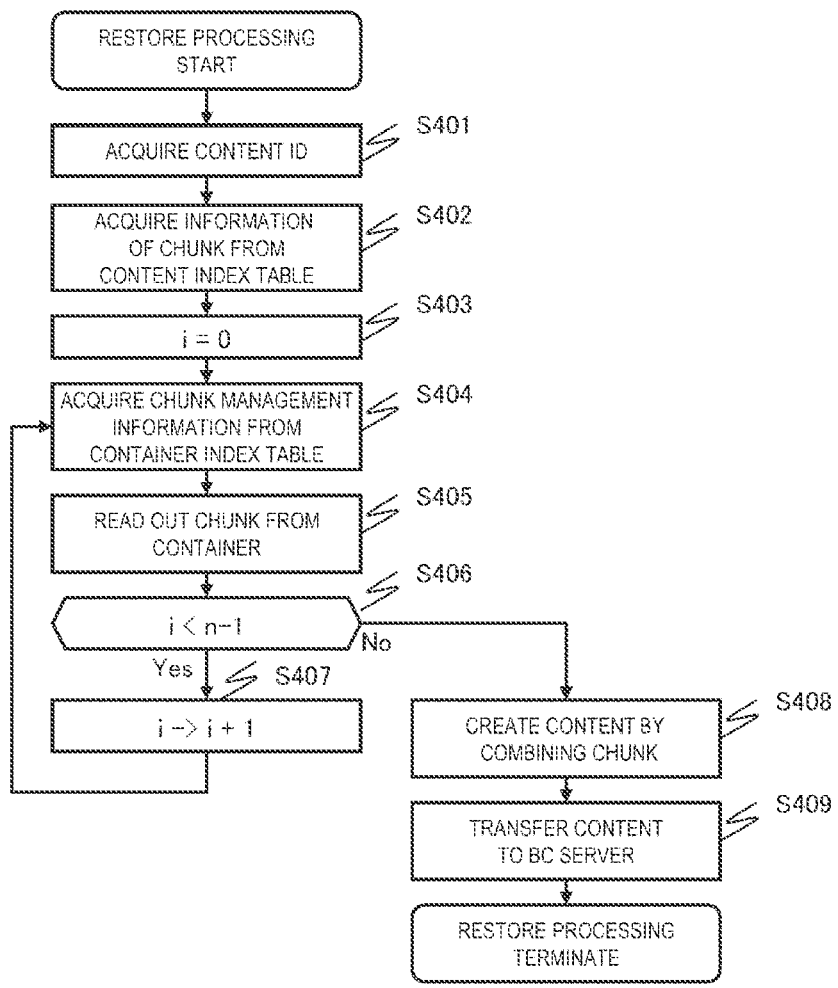
FIG. 14 is a flowchart of restore processing according to the first embodiment.

FIG. 14 is a flowchart of restore processing according to the first embodiment. Note that, the restore processing in FIG. 14 is a flowchart of the processing of the BC system 1 for one content.

The restore processing is started, for example, in response to a restore processing start instruction from the management terminal 12 or a read out request of the content backed up by the BC server 100.

In step S401, the restore program 123 of the BC server 100 acquires an identifier of the content of a restore target, and notifies the storage 200 of the restore request of the content including the content identifier. The restore program 123, for example, acquires the identifier of the content from a stub file generated in step S112 in the backup processing.

Next, in step S402, the restore program 222 of the storage 200 reads out the content index table 600 corresponding to the content identifier included in the restore request received from the BC server 100. Then, the restore program 222 acquires and holds the management information of the chunk constituting the content of the restore processing target which is described in the entry of the content index table 600.

Next, in step S403, the restore program 222 of the BC server 100 initializes a value of the counter i that stores the number of times of execution of the following loop processing (S404 to S407) to 0. The value of the counter i represents the chunk being set as the processing target in the loop together with the number of times of execution of the loop processing; and in the loop processing in which the counter i=k, it represents that the (k+1)th chunk is set as the processing target from the head of the content.

Next, in step S404, the restore program 222 of the storage 200 acquires the information of the chunk of the processing target (processing target chunk) from the container index tables (820, 920). First, the restore program 222 acquires the container index tables (820, 920) of the corresponding container based on a value of the container ID 603 of the entry of the content index table 600 corresponding to the processing target chunk. Note that, the restore program 222 acquires the BC container index table 820 when the BC block chunk determination 606 of the entry of the content index table 600 is "True", and acquires the normal container index table 920 when the BC block chunk determination 606 is "False".

Next, from the acquired container index table, the restore program 222 searches for an entry in which the values of FP and the chunk length of the content index table 600 match, and holds the information of the matching entry obtained by the search as the management information of the processing target chunk.

Next, in step S405, the restore program 222 of the storage 200 reads out the data of the processing target chunk from the storage device 230. Specifically, the restore program 222 specifies a storage location of the processing target chunk in the storage device 230 based on the container ID and the chunk length acquired from the content index table in step S402 and the offset acquired from the container index table in step S404, and reads out and holds the data of the specified storage location.

Next, in step S406, the restore program 222 of the storage 200 confirms whether processing for all chunks in the processing target content has been completed. Specifically, when a value of the counter i is less than n−1 (S406: Yes), which means that there is an unprocessed chunk, the restore program 222 of the storage 200 moves the processing to step S407 in order to continue the restore processing. Meanwhile, when the counter i is equal to or larger than n−1 (S406: No), which means that the processing of all chunks has been completed, the restore program 222 of the storage 200 moves processing to step S408.

In step S407, the restore program 222 of the storage 200 changes the processing target chunk to the next chunk in the processing target content, and moves the processing to step S404. Specifically, the restore program 222 of the storage 200 adds 1 to the value of the counter i to change the processing target chunk. For example, when the counter i=k, by updating to i=i+1, the processing target chunk is changed from the head of the processing target content to the (k+2)th chunk.

In step S408, the restore program 222 of the storage 200 combines the chunks read out and restores the content of the restore target. Specifically, the restore program 222 restores the content by arranging each chunk acquired in step S405 at the position specified by the offset 604 and the chunk length 605 of the content index table 600.

Next, in step S409, the restore program 222 of the storage 200 transfers the restored content to the BC server 100, and terminates the restore processing after the transfer of the content has been completed.

Note that, though the restore processing corresponding to the backup processing is described, the same processing as the restore processing can be realized as long as it is processing in which the content stored in the storage 200 from the BC server 100 is acquired from the BC server 100. Specifically, the same processing can be performed for, for example, moving the content data at the time of tiering to the BC server 100 or acquiring the content data corresponding to a read request from the BC server 100 from the storage 200, and the like.

As described above, according to the BC system 1 according to the above embodiment, efficient deduplication processing can be realized by utilizing the data structure of the BC block 500 and reducing the hash calculation processing in the deduplication processing of the content data.

Further, in the above embodiment, since the FP 410 for the chunk 400 including the plurality of BC blocks 500 is managed, the number of entries of the BC FPT 800 can be reduced, and an increase in the size of the BT FPT 800 and an increase in search processing load can be prevented. Therefore, the usage amount of the storage device, the I/O load, the network bandwidth load, etc. related to the BC FPT 800 can be reduced.

Next, a BC system 1A according to a second embodiment will be described.

The BC system 1A according to the present embodiment has the same configuration as the BC system 1 according to the first embodiment shown in FIG. 2.

Figure 15:
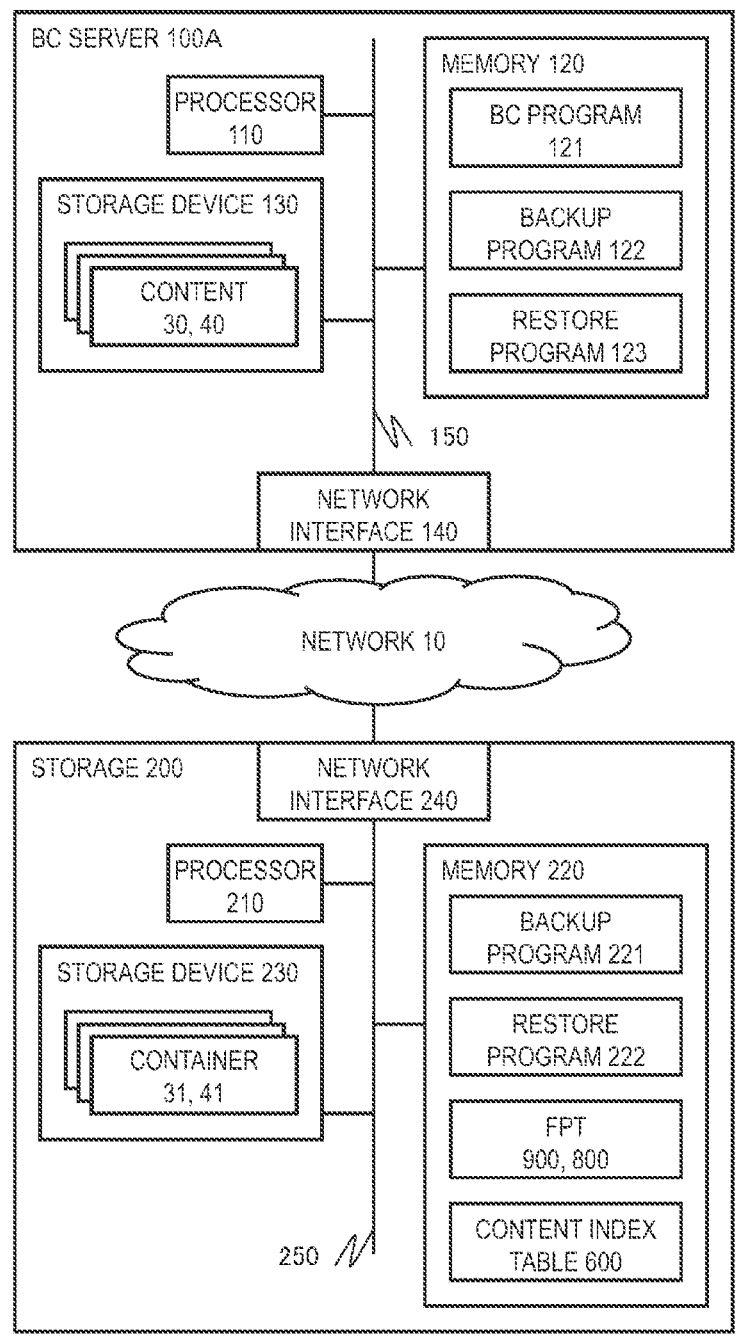
FIG. 15 is a configuration diagram of a BC server and a storage system according to a second embodiment.

FIG. 15 is a configuration diagram of a BC server and a storage system according to the second embodiment. Note that, in FIG. 15, the same parts as those in the first embodiment are denoted by the same reference numerals, and repetitive descriptions thereof will be omitted.

The BC server 100A according to the second embodiment does not include the container index tables 920, 820 in the BC server 100 according to the first embodiment and does not implement the duplication determination processing at the time of the backup processing.

Figure 16:
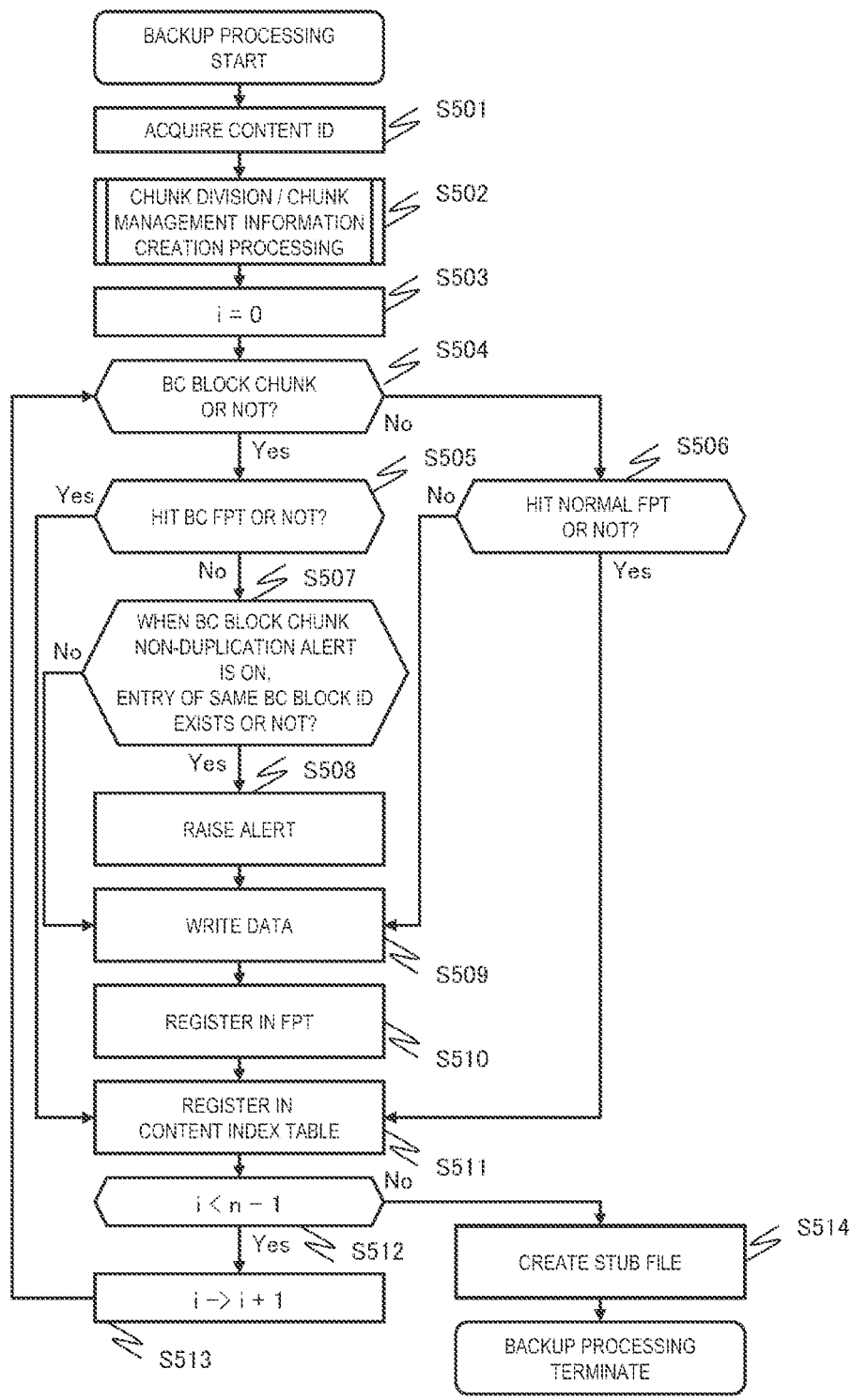
FIG. 16 is a flowchart of backup processing according to the second embodiment.

FIG. 16 is a flowchart of backup processing according to the second embodiment.

Steps S501 to S503 are processing executed by the backup program 221 of the storage 200, and processing contents are the same as steps S101 to S103 in FIG. 11. Steps S504 to S510 are the same as steps S302, S303, and S305 to S308 in FIG. 13. Steps S511 to S513 are processing executed by the backup program 221 of the storage 200, and processing contents are the same as steps S109 to S111 in FIG. 11. Step S514 is the same as step S112 in FIG. 11.

In the backup processing according to the second embodiment, the BC server 100A executes the storage 200 without executing deduplication processing.

Restore processing in the BC system 1A according to the second embodiment is substantially the same as the restore processing according to the first embodiment shown in FIG. 14.

According to the above second embodiment, even if the BC server 100A does not have a deduplication function, deduplication of data can be appropriately performed by the server 200. Therefore, an increase in the processing load of the BC server 100A can be reduced, and the deduplication of data can be performed.

Note that, the present invention is not limited to the above embodiments, and can be appropriately modified and implemented without departing from the spirit of the present invention.

For example, in the above embodiments, though the deduplication is performed on all the BC servers 100 of the BC system 1, the present invention is not limited thereto. For example, when the BC system 1 is configured by the BC servers 100 of a plurality of organizations, the deduplication may be performed with data (content) managed by the BC server 100 belonging to a certain organization as a target.

Further, in the above embodiments, though a plurality of BC blocks 500 are included in one BC block chunk 400, the present invention is not limited thereto. One BC block 500 may be included in one BC block chunk 400.

Further, in the above embodiment, the block chain 4 in which one or more transaction data 510 and the hash value of the preceding block 500 are configured as the block 500 is described as an example, but the present invention is not limited thereto. For example, an odd-numbered block may be configured by one or more transaction data and a hash value of a previous odd-numbered block, and an even-numbered block may be configured by one or more transaction data and a hash value of a previous even-numbered block. Further, the odd-numbered block may be configured by one or more transaction data, and the even-numbered block may be configured by one or more transaction data and a hash value of a previous block and a hash value of two previous blocks. In short, the hash value of a certain block may be managed so as to be able to specify another block in which the hash value is stored. In other words, the hash value of a certain block may be managed by another block having a predetermined relationship. Further, for example, one or more transaction data (transaction data group) and the hash value of the data group equivalent to the preceding block (block equivalent data group: the hash value of the transaction data group and the hash value of the preceding block equivalent data group) may be managed in association with each other without being blocked, and each block equivalent data group may be structured as a chain according to the generation order. In short, the data structure may be any data structure that can specify and acquire a corresponding hash value from the block equivalent data group.

Further, in the above embodiments, part or all of the processing performed by the processor may be performed by hardware circuit. Further, the program in the above embodiments may be installed from a program source. The program source may be a program distribution server or a storage medium (for example, a portable storage medium).

What is claimed is:
1. A data deduplication device that eliminates duplication of storage target data and stores the storage target data in a storage device for storage, wherein the storage target data includes a data set including a plurality of data groups managed in time series, the data groups include one or more management data, and a hash value of a first data group among the data groups is stored in a second data group, among the data groups, having a predetermined relationship with the first data group, the data deduplication device, comprising:

a storage device that stores the data set and a processor unit,
wherein the processor unit is programmed to:
acquire the hash value of the first data group of storage unit data from the second data group, and specify a fingerprint corresponding to the storage unit data based on the acquired hash value of the first data group,
determine whether the fingerprint corresponding to the storage unit data is the same as a fingerprint of stored storage unit data stored in the storage device for storage, and
not store the storage unit data in the storage device for storage when it is determined that the fingerprint corresponding to the storage unit data is the same as the fingerprint of the stored storage unit data, and store the storage unit data in the storage device for storage when it is determined that the fingerprint corresponding to the storage unit data is not the same as the fingerprint of the stored storage unit data.

2. The data deduplication device according to claim 1, wherein
the data group in the data set is formed as a block including one or more of the management data and a hash value of a preceding data group, and a hash value generated based on the management data of the data group and the hash value is stored in another data group.

3. The data deduplication device according to claim 1, wherein
the storage unit data includes a plurality of data groups, and
the processor unit sets a value obtained by an exclusive OR (XOR) of hash values of the data groups included in the storage unit data as a fingerprint corresponding to the storage unit data.

4. The data deduplication device according to claim 1, wherein
the storage device stores fingerprint information including a fingerprint of one or more of the stored storage unit data stored in the storage device for storage.

5. The data deduplication device according to claim 1, wherein
the storage device stores data set storage destination information set as a storage destination of the data set, and
the processor unit determines whether or not the storage target data is a data set based on whether or not the storage target data is stored in a storage destination shown by the data set storage destination information, and executes the above (1) to (3) when the storage target data is the data set.

6. The data deduplication device according to claim 1, wherein
the storage target data includes the data set and data other than the data set, and
the processor unit
divides data other than the data set into predetermined sizes to generate another type of storage unit data, generates a fingerprint of the another type of storage unit data,
determines whether or not the fingerprint corresponding to the another type of storage unit data is the same as the fingerprint of the stored storage unit data stored in the storage device for storage, and
does not store the another type of storage unit data in the storage device for storage when it is determined that the fingerprint corresponding to the another type of storage unit data is the same as the fingerprint of the stored storage unit data, and stores the another type of storage unit data in the storage device for storage when it is determined that the fingerprint corresponding to the another type of storage unit data is not the same as the fingerprint of the stored storage unit data.

7. The data deduplication device according to claim 6, wherein
the storage unit data and the another type of storage unit data are made different in sizes.

8. The data deduplication device according to claim 6, wherein
the storage device stores first fingerprint information including a fingerprint of the stored storage unit data corresponding to the storage unit data stored in the storage device for storage and second fingerprint information including a fingerprint of the stored storage unit data corresponding to the another type of storage unit data stored in the storage device for storage.

9. The data deduplication device according to claim 1, wherein
the data deduplication device is a storage system including the storage device for storage,
the storage device stores fingerprint information including a fingerprint of one or more stored storage unit data stored in the storage device for storage, and
the processor unit sends a fingerprint of another stored storage unit data strongly related to the stored storage unit data to another data deduplication device when receiving the storage unit data and the fingerprint of the storage unit data from the another data deduplication device, and when the stored storage unit data of the same fingerprint as the received fingerprint is stored in the fingerprint information.

10. The data deduplication device according to claim 1, wherein
the processor unit issues an alert when the fingerprint of the storage unit data is detected to be not matching a fingerprint of stored storage unit data including the same data group as that in the storage unit data.

11. A data deduplication method by a data deduplication device that eliminates duplication of storage target data and stores the storage target data in a storage device for storage, wherein the storage target data includes a data set including a plurality of data groups managed in time series, the data groups include one or more management data, and a hash value of a first data group among the data groups is stored in a second data group, among the data groups, having a predetermined relationship with the first data group, the data deduplication method, comprising:
acquiring the hash value of the first data group of storage unit data from the second data group, and specifying a fingerprint corresponding to the storage unit data based on the acquired hash value of the first data group,
determining whether the fingerprint corresponding to the storage unit data is the same as a fingerprint of stored storage unit data stored in the storage device for storage, and not storing the storage unit data in the storage device for storage when it is determined that the fingerprint corresponding to the storage unit data is the same as the fingerprint of the stored storage unit data, and storing the storage unit data in the storage device for storage when it is determined that the fingerprint corresponding to the storage unit data is not the same as the fingerprint of the stored storage unit data.

12. A data deduplication program that is stored on a memory and executed by a computer constituting a data deduplication device that eliminates duplication of storage target data and stores the storage target data in a storage device for storage, wherein the storage target data includes a data set including a plurality of data groups managed in time series, the data groups include one or more management data and a hash value of a first data group among the data groups is stored in a second data group, among the data groups, having a predetermined relationship with the first data group, and the data deduplication program causes the computer to execute steps comprising:

acquiring the hash value of the first data group of storage unit data from the second data group, and specifying a fingerprint corresponding to the storage unit data based on the acquired hash value of the first data group;

determining whether the fingerprint corresponding to the storage unit data is the same as a fingerprint of stored storage unit data stored in the storage device for storage, and not storing the storage unit data in the storage device for storage when it is determined that the fingerprint corresponding to the storage unit data is the same as the fingerprint of the stored storage unit data, and storing the storage unit data in the storage device for storage when it is determined that the fingerprint corresponding to the storage unit data is not the same as the fingerprint of the stored storage unit data.

* * * * *